(12) United States Patent  (10) Patent No.: US 6,707,570 B1
Gotanda et al.  (45) Date of Patent: Mar. 16, 2004

(54) IMAGE PRINTING SYSTEM AND METHOD OF CONTROLLING OPERATION OF SAME

(75) Inventors: Yoshiharu Gotanda, Asaka (JP); Akihisa Yamazaki, Asaka (JP); Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/559,995

(22) Filed: Apr. 27, 2000

(30) Foreign Application Priority Data

Apr. 27, 1999 (JP) .......................................... 11-119014

(51) Int. Cl.[7] .............................................. G06H 15/00
(52) U.S. Cl. ..................................... 358/1.15; 358/1.18
(58) Field of Search ........................ 358/1.1, 1.6, 1.18, 358/1.15, 402, 403, 408; 705/1, 5, 6, 13, 21, 77

(56) References Cited

U.S. PATENT DOCUMENTS 4,922,439 A * 5/1990 Greenblatt ..................... 705/6

* cited by examiner

*Primary Examiner*—Arthur G. Evans
(74) *Attorney, Agent, or Firm*—Birch, Stewart, Kolasch & Birch, LLP

(57) ABSTRACT

A user's point of departure (Airport A) and point of arrival (Airport B) are read from boarding-ticket information that has been recorded on an airplane boarding ticket. Areas indicating the departure and arrival points that have been read are displayed on a display screen and the user designates the airport at which printed images are to be picked up. The printing of the images is ordered at the point of departure. When the user reaches the airport that is the designated point of arrival, the ordered images will have already been printed and, hence, the user picks up the prints at the arrival point. This makes it possible to pick up prints immediately at a point along one's journey.

15 Claims, 27 Drawing Sheets

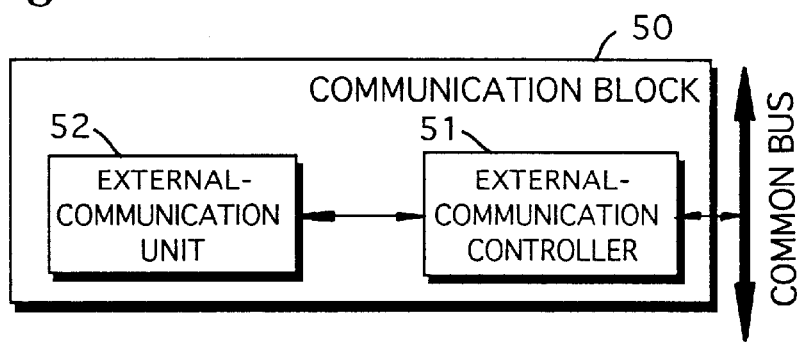
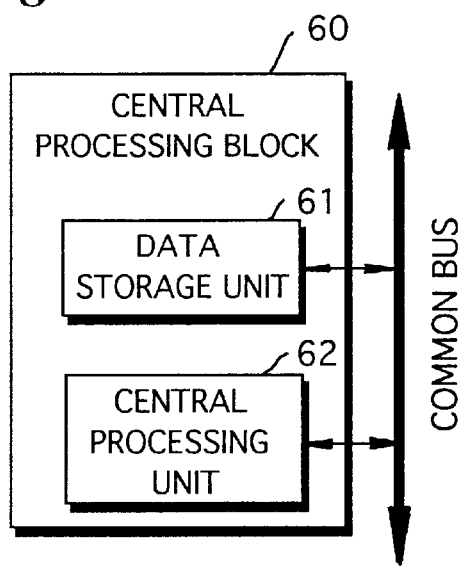

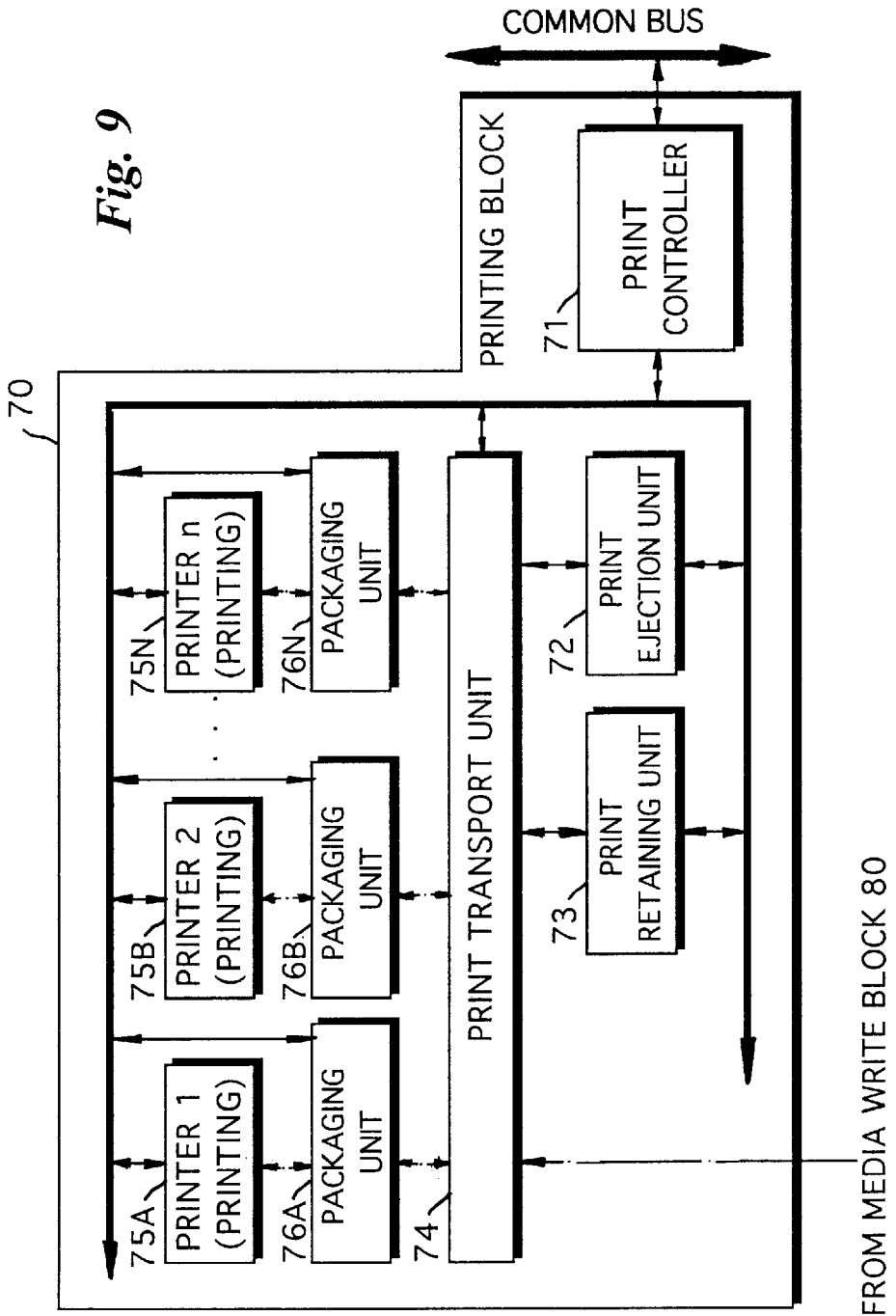

Fig. 13

| DATA ITEM | DATA | | | | | | |
|---|---|---|---|---|---|---|---|
| | 000 | 002 | 003 | 004 | ... | xxx | |
| ADDRESS OF ORDERING APPARATUS | | | | | | | |
| LOCATION | AIRPORT A | AIRPORT B | AIRPORT C | AIRPORT D | ... | AIRPORT Z | |
| OPERATING STATUS | READY | BUSY | READY | NG | ... | READY | |
| NUMBER OF INTERNAL PRINTERS | 2 | 2 | 2 | 2 | ... | 2 | |
| PRINTER 1 : NUMBER OF SHEETS REMAINING | 230 | 100 | 198 | 376 | ... | | |
| PRINTER 1: CAPABILITY | 20sec/sheet | 20sec/sheet | 30sec/sheet | 20sec/sheet | ... | 20sec/sheet | |
| PRINTER 1: JOB COUNT | 0 | 0 | 1 | 0 | ... | 0 | |
| PRINTER 1: TIME REQUIRED FOR JOB 1 | - | - | 600sec | - | ... | - | |
| PRINTER 1: COMPLETION TIME FOR JOB 1 | - | - | 15:30 | - | ... | - | |
| PRINTER 1: TIME LIMIT FOR JOB 1 | - | - | 15:30 | - | ... | - | |
| : | : | : | : | : | ... | : | |
| PRINTER 1: TIME REQUIRED FOR JOB N | - | - | - | - | ... | - | |
| PRINTER 1: COMPLETION TIME FOR JOB N | - | - | - | - | ... | - | |
| PRINTER 1: TIME LIMIT FOR JOB N | - | - | - | - | ... | - | |
| : | : | : | : | : | ... | : | |
| PRINTER N: NUMBER OF SHEETS REMAINING | 230 | 100 | 198 | 376 | ... | 2 | |
| PRINTER N: CAPABILITY | 20sec/sheet | 20sec/sheet | 30sec/sheet | 20sec/sheet | ... | 20sec/sheet | |
| PRINTER N: JOB COUNT | 0 | 0 | 0 | 0 | ... | 0 | |
| PRINTER N: TIME REQUIRED FOR JOB 1 | - | - | - | - | ... | - | |
| PRINTER N: COMPLETION TIME FOR JOB 1 | - | - | - | - | ... | - | |
| PRINTER N: TIME LIMIT FOR JOB 1 | - | - | - | - | ... | - | |
| : | : | : | : | : | ... | : | |
| PRINTER N: TIME REQUIRED FOR JOB N | - | - | - | - | ... | - | |
| PRINTER N: COMPLETION TIME FOR JOB N | - | - | - | - | ... | - | |
| PRINTER 1: TIME LIMIT FOR JOB N | - | - | - | - | ... | - | |

*Fig. 22*

PRINT ORDER SLIP

| ACCEPTANCE ID | 0019907050001 |
|---|---|
| ACCEPTANCE DATA AND TIME | 1999.07.05.13.00 |
| ACCEPTANCE LOCATION | AIRPORT A |
| ORDERING APPARATUS NO. | 001 |
| PRINT PICK-UP POINT | AIRPORT B |
| SCHEDULED DATA AND TIME OF PRINT PICK-UP | 1997.07.05.14.45 |
| PRINT PICK-UP APPARATUS NO. | 002 |
| NAME OF ORDERER | FUJITARO |

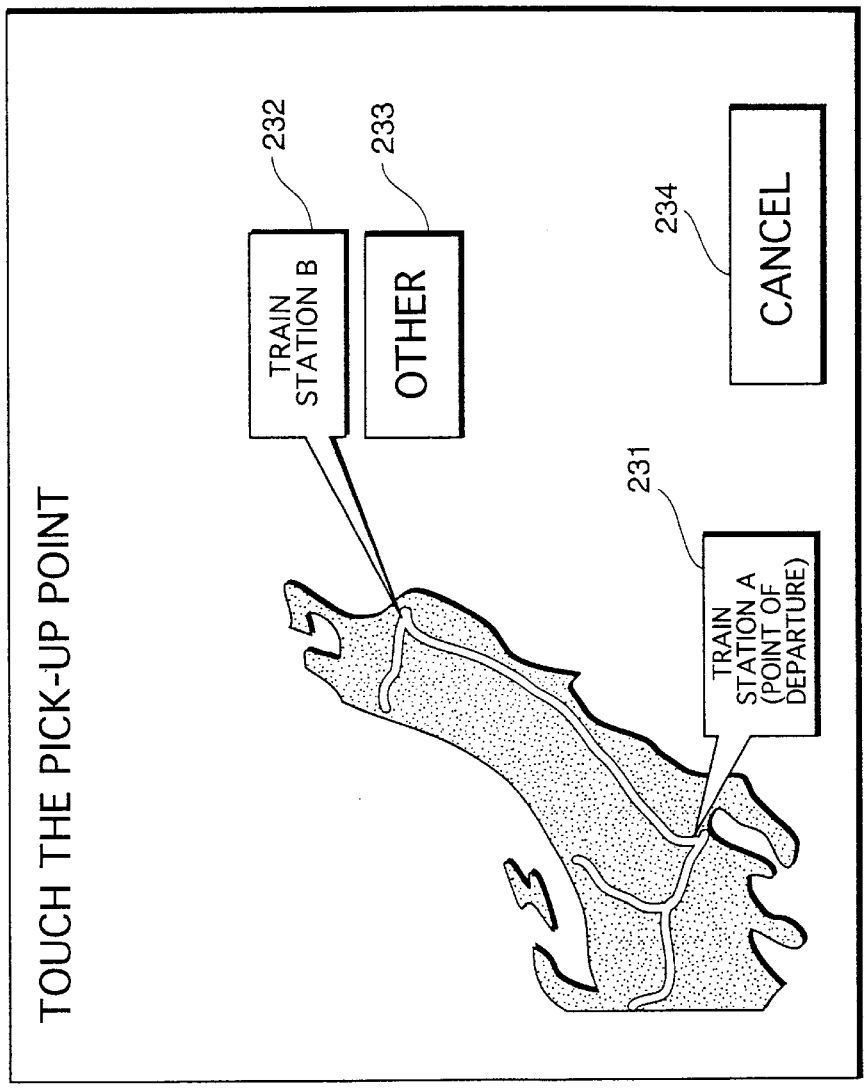

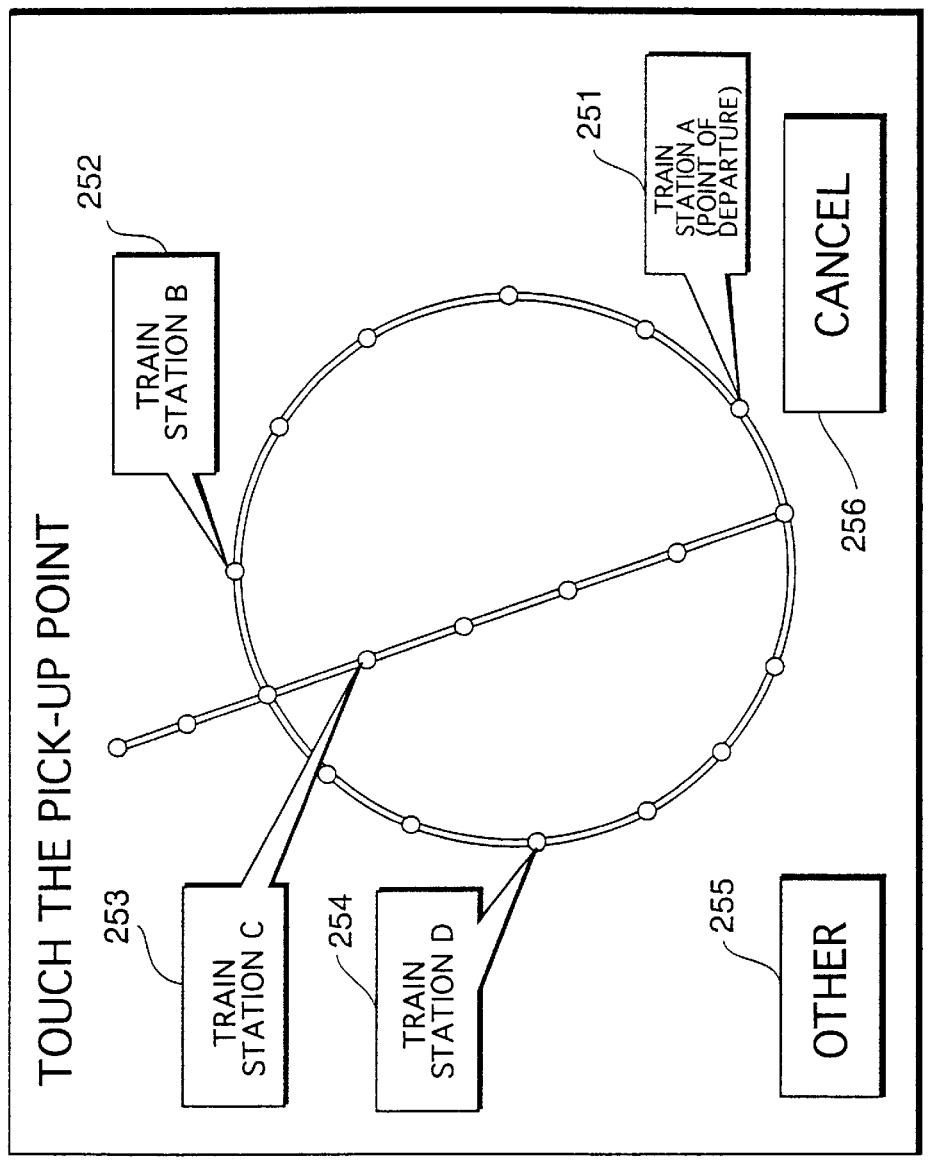

IMAGE PRINTING SYSTEM AND METHOD OF CONTROLLING OPERATION OF SAME

BACKGROUND OF THE INVENTION

1. Field of the Invention

This invention relates to an image printing system consisting of an image-print ordering apparatus and an image printing apparatus capable of communicating data with each other, a method of controlling the operation of this system, the image-print ordering apparatus, a method of controlling the operation of this apparatus, an image output apparatus and a method of controlling the operation of this apparatus.

2. Description of the Related Art

The realization of image printing services utilizing networks have been accompanied by the development of digital cameras, the proliferation of personal computers and the building of networks. In an image printing service of this kind, image data obtained by using a digital camera is transmitted to a host computer through use of a personal computer in the possession of the user. Images are printed by using a high-resolution printer that is connected to the host computer, and the prints obtained by printing the images are sent to a photo lab specified by the user. The user goes to the photo lab to pick up the prints.

Because it is convenient, a photo lab in the vicinity of the user's residence often is specified as the place where the prints are to be picked up. However, photographs are not always taken in the vicinity of the user's residence but are often taken at points along a journey, for example. If the user specifies that a photo lab near his or her residence is to receive printed images in a case where the images to be printed were captured on a journey by a digital camera, the user cannot receive the prints until returning home.

DISCLOSURE OF THE INVENTION

Accordingly, an object of the present invention is to arrange it so that the prints of images captured by a digital camera can be received at once even if one is away from home.

An image printing system according to the present invention comprises an image-print ordering apparatus and an image printing apparatus capable of communicating with each other.

The image-print ordering apparatus includes a destination information reading unit for reading destination-related information from a ticket on which the destination-related information has been recorded in a readable manner; an image data reading unit for reading image data that has been recorded on a first portable recording medium; and an image data transmitting unit for transmitting the image data, which has been read by the image data reading unit, to the image printing apparatus deployed at a destination specified based upon the destination-related information read by the destination information reading unit.

The image printing apparatus includes: an image data receiving unit for receiving image data transmitted from the image data transmitting unit of the image-print ordering apparatus; and a printing unit for printing an image represented by the image data received by the image data receiving unit.

The present invention provides also an operation control method suited to the image printing system described above. Specifically, the invention provides a method of controlling operation of an image printing system consisting of an image-print ordering apparatus and an image printing apparatus capable of communicating with each other.

The method includes the following steps executed by the image-print ordering apparatus: reading destination-related information from a ticket on which the destination-related information has been recorded in a readable manner; reading image data that has been recorded on a first portable recording medium; and transmitting read image data to the image printing apparatus deployed at a destination specified based upon the read destination-related information.

The method includes also the following steps executed by the image printing apparatus: receiving image data transmitted from the image data transmitting unit of the image-print ordering apparatus; and printing an image represented by the received image data.

In accordance with the present invention, use is made of ticket (an airplane ticket, a train or bus ticket on which magnetic information has been recorded) on which destination-related information (the destination per se or an indication of a range of locations to which travel is possible) has been recorded in readable fashion. According to the invention, the destination-related information that has been recorded on the ticket is read by the image-print ordering apparatus. Further, image data that has been recorded on a first portable recording medium is read by the image-print ordering apparatus. The destination of the user is found from the destination-related information that has been read. The read image data is transmitted to the image printing apparatus deployed at the user's destination that has been found.

The image data transmitted from the image-print ordering apparatus is received by the image printing apparatus and images represented by this image data are printed by the printing apparatus.

Image-print ordering processing is executed at the point of departure, which is where the image-print ordering apparatus is located. When the user arrives at the destination upon traveling from the departure point, images are printed by the image printing apparatus, which has been installed at the place of arrival. Since images will have been printed when the user arrives, the user can pick up the prints of the images immediately at points along a journey.

A host computer for overall control of the image printing system may be provided. In such case the image-print ordering apparatus transmits image data read by the image data reading unit to the host computer. The latter transmits the image data, which has been sent to it from the image-print ordering apparatus, to the image printing apparatus deployed at the destination identified by the destination-related information. Furthermore, the image printing apparatus receives the image data transmitted from the host computer.

The user may be notified of the destination specified based upon the destination-related information read by the image-print ordering apparatus. The user is therefore capable of confirming the place at which the prints are to be picked up.

In a case where there are multiple locations to which the user can travel by the ticket, notification of these multiple locations is given based upon the destination-related information read by the destination information reading unit at the image-print ordering apparatus, thereby allowing the user to specify the destination location from among the multiple locations of which notification has been given.

In this case the image data transmitting unit of the image-print ordering apparatus transmits the read image data to the image printing apparatus deployed at the specified location.

Thus, even if multiple locations can be traveled to using the ticket, images can be printed by the image printing apparatus deployed at the destination and the prints of these images can be picked up at the destination.

If data representing arrival time has been readably recorded on the ticket, then the image-print ordering apparatus reads the arrival-time data from the ticket and transmits the read arrival-time data to the image printing apparatus deployed at the destination decided based upon the destination-related information. The image printing apparatus receives the transmitted arrival-time data and exercises control is such a manner that images are printed prior to the arrival time represented by the received arrival-time data.

Thus, it is possible to finish the printing of images before the user arrives.

The image-print ordering apparatus may be so adapted as to issue identification data and transmit the issued identification data to the image printing apparatus deployed at the destination specified by the destination-related information.

In this case, the image printing apparatus receives the identification data transmitted from the image-print ordering apparatus. Further, identification data is input to the image printing apparatus. The latter determines whether the received identification data matches the input identification data and responds to determination of a match by printing the images.

By thus checking for a match of identification data, only a user duly authorized to receive the prints of images can receive the prints.

If identification data has been readably recorded on the ticket, it is also possible to read the image data from the ticket at both the image-print ordering apparatus and image printing apparatus.

Preferably, a warning is issued when the non-matching of identification data is detected.

The image printing system described above may be adapted in such a manner that image data received by the image data receiving unit is recorded on a second portable recording medium. When the user travels from the location at which the image-print ordering apparatus is deployed to the location at which the image printing apparatus is deployed, the second portable recording medium, which is equivalent to the first portable storage medium in the possession of the user, can be returned to the user.

Data indicating the fact that the printing of images has been ordered may be recorded on the ticket at the image-print ordering apparatus. In such case the image printing apparatus reads this order indicating data that has been recorded on the ticket and, in response to reading of this data, gives notification of the fact that the printing of images has been ordered.

Issuing notification that printing of images has been ordered assures that the user will not forget to pick up the printed images that he or she has ordered.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a block diagram showing the details of the electrical construction of a communication block;

FIG. 8 is a block diagram showing the details of the electrical construction of a central processing block;

FIG. 9 is a block diagram showing the details of the electrical construction of a printing block;

FIG. 13 illustrates a management table of a print ordering apparatus.

FIG. 22 illustrates an example of a printing order slip;

FIGS. 27 and 28 illustrate examples of display screens presented on the display unit of the print ordering apparatus.

DESCRIPTION OF THE PREFERRED EMBODIMENT

A preferred embodiment of the present invention will now be described in detail with reference to the accompanying drawings.

Figure 1:
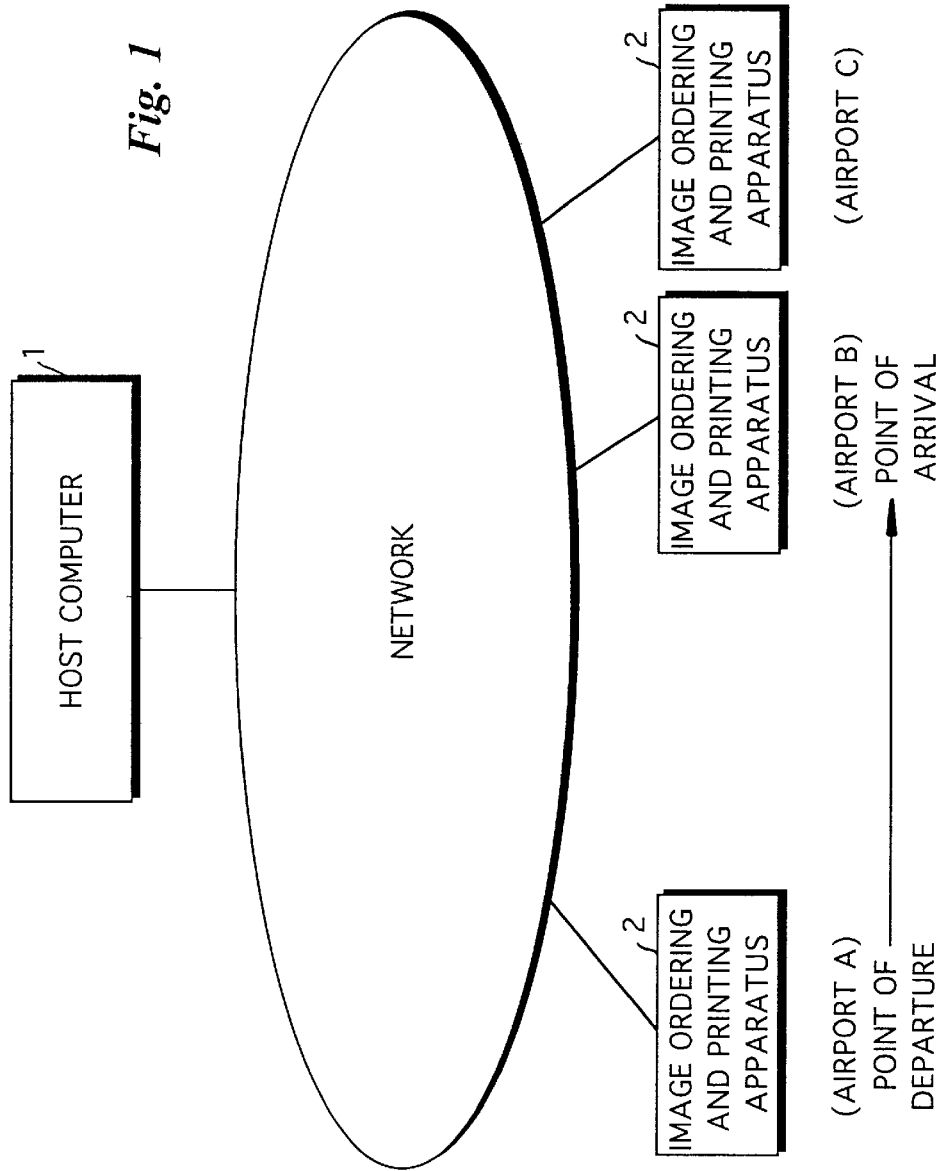
FIG. 1 is a diagram illustrating an overview of an image printing system according to the present invention.

FIG. 1 illustrates the overall configuration of an image printing system according to a preferred embodiment of the present invention.

As shown in FIG. 1, the image printing system includes a host computer 1 and a plurality of image ordering and printing apparatus 2 capable of communicating data with each other via a network. The image ordering and printing apparatus 2 are deployed at airports A, B and C. Each image ordering and printing apparatus 2 executes both processing for ordering the printing of images and processing for printing images.

This embodiment is such that if a user departs from airport A and arrives at airport B, processing for ordering the printing of images is executed at airport A and the user picks up the prints, which have been printed in accordance with the ordering processing, at airport B.

Figure 2:
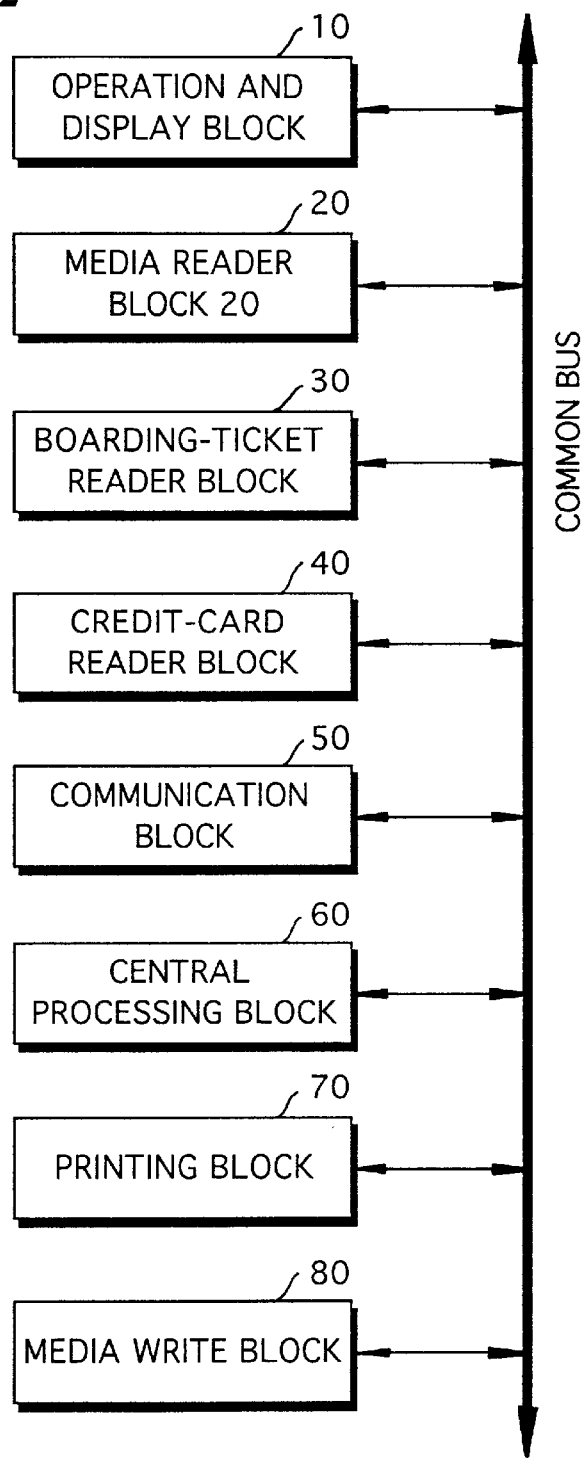
FIG. 2 is a block diagram showing the electrical construction of an image-print ordering apparatus.

FIG. 2 is a block diagram illustrating the electrical construction of each image ordering and printing apparatus 2.

The image ordering and printing apparatus 2 is divided into blocks interconnected by a common bus. The blocks included in the image ordering and printing apparatus 2 will now be described.

Operation and display block 10:

This block allows the user to perform operations and displays various information for the user to observe.

Medium reader block 20:

This block is for reading image data from a medium (a portable recording medium).

Boarding-ticket reader block 30:

This block is for reading boarding-ticket information that has been recorded on a boarding ticket in the possession of the user.

Credit-card reader block 40:

This block is for reading credit-card information that has been recorded on a credit card in the possession of the user.

Communication block 50:

This is a block for carrying out data communication with the host computer 1 and with other image ordering and printing apparatus 2.

Central processing block 60:

This block is for exercising control of the overall operation of the image ordering and printing apparatus.

Printing block 70:

This block is for printing images represented by image data.

Medium write block 80:

This block is for writing image data to media.

Figure 3:
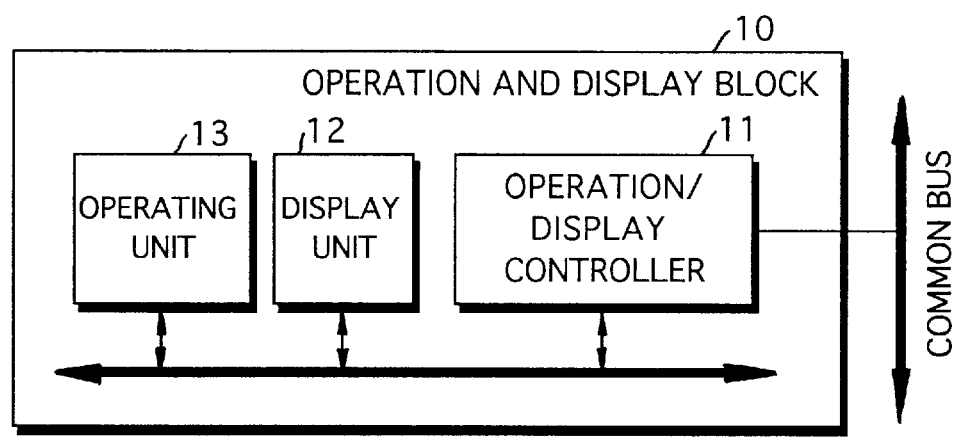
FIG. 3 is a block diagram showing the details of the electrical construction of an operation display block.

FIG. 3 is a block diagram showing the details of the electrical construction of the operation display block 10.

As mentioned above, the operation and display block 10 allows the user to perform operations and displays various information for the user to observe. The operation and display block 10 includes an operation/display controller 11 for controlling operation commands provided by the user and the display of various information; a display unit 12 for displaying various information for the user; and an operating unit 13 for applying operation commands to the image ordering and printing apparatus 2. The operation/display controller 11 is connected to the common bus. The operation/display controller 11, the display unit 12 and the operating unit 13 are interconnected by an internal bus.

Figure 4:
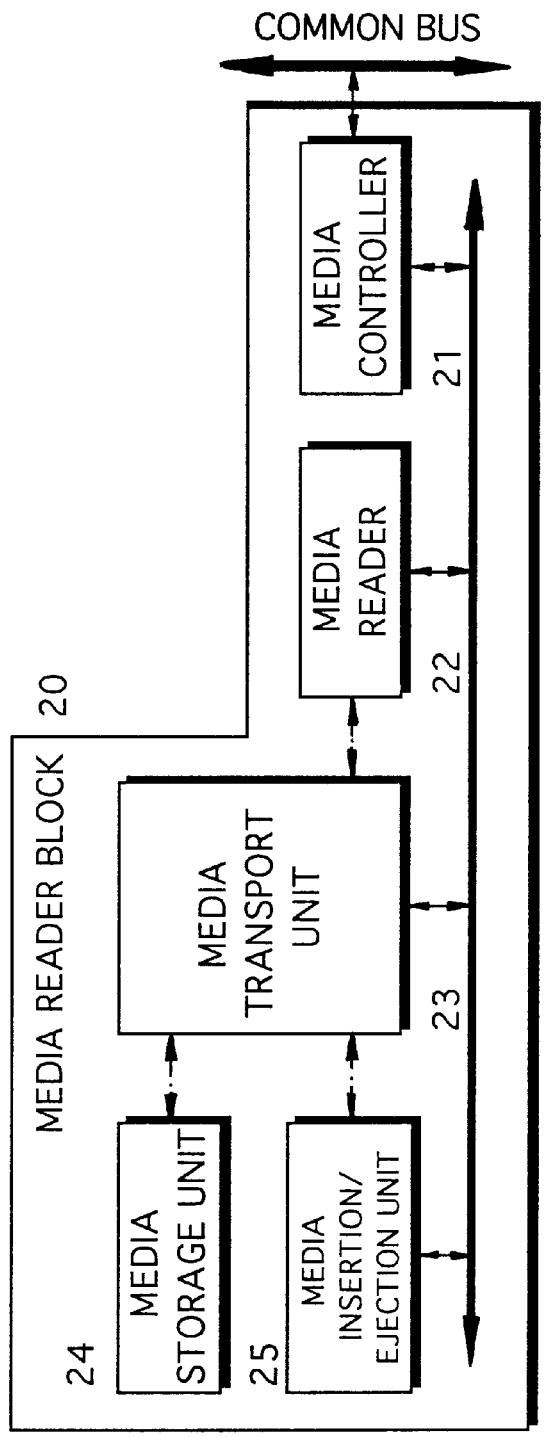
FIG. 4 is a block diagram showing the details of the electrical construction of a medium reader block.

FIG. 4 is a block diagram illustrating the details of the electrical construction of the medium reader block 20.

The medium reader block 20 is for reading image data that has been recorded on a medium. The medium reader block 20 includes a medium controller 21 for exercising control of the overall operation of the medium reader block 20; a medium insertion/ejection unit 25 for inserting the medium into and ejecting it from the image ordering and printing apparatus 2; a medium transport unit 23; a medium reader 22 for reading image data that has been recorded on medium; and a medium storage unit 24 for temporarily storing the medium. The medium controller 21, the medium reader 22, the medium transport unit 23 and the medium insertion/ejection unit 25 are connected by the internal bus. The medium controller 21 is connected to the common bus.

Figure 5:
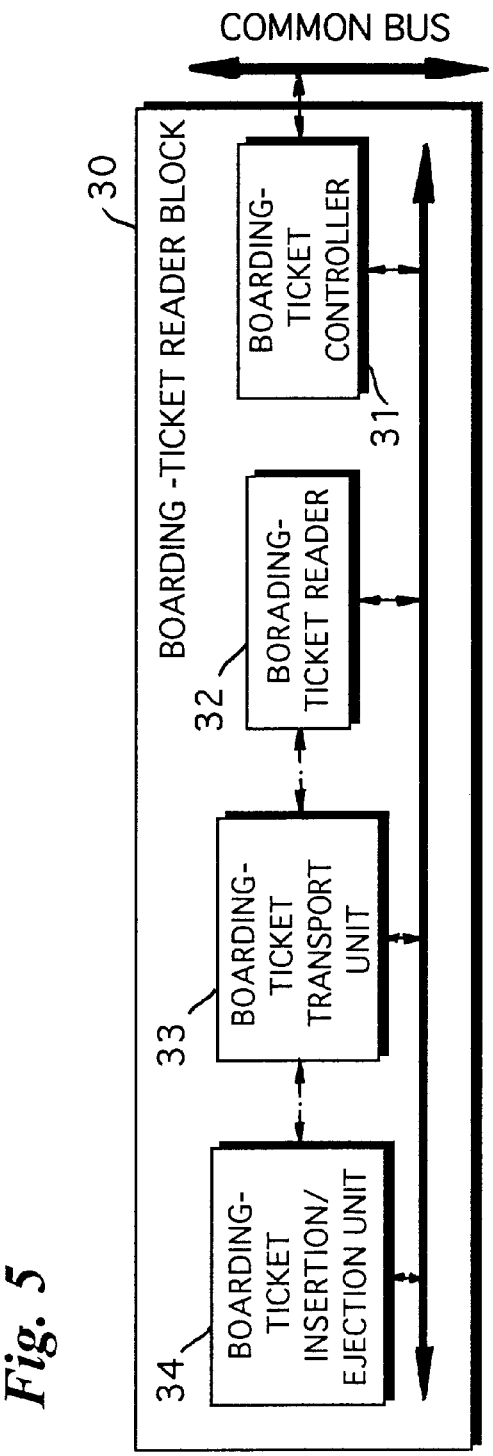
FIG. 5 is a block diagram showing the details of the electrical construction of a boarding-ticket reader block.

FIG. 5 is a block diagram illustrating the details of the electrical construction of the boarding-ticket reader block 30. The boarding-ticket reader block 30 includes boarding-ticket controller 31 for exercising control of the overall operation of the boarding-ticket reader block 30; a boarding-ticket insertion/ejection unit 34 for inserting a boarding ticket into and ejecting it from the image ordering and printing apparatus 2; a boarding-ticket transport unit 33 for transporting an inserted boarding ticket; a boarding-ticket reader 32 for reading boarding-ticket information that has been recorded on a boarding ticket. The components 31 to 34 are connected by the internal bus. The boarding-ticket controller 31 is connected to the common bus.

Figure 6:
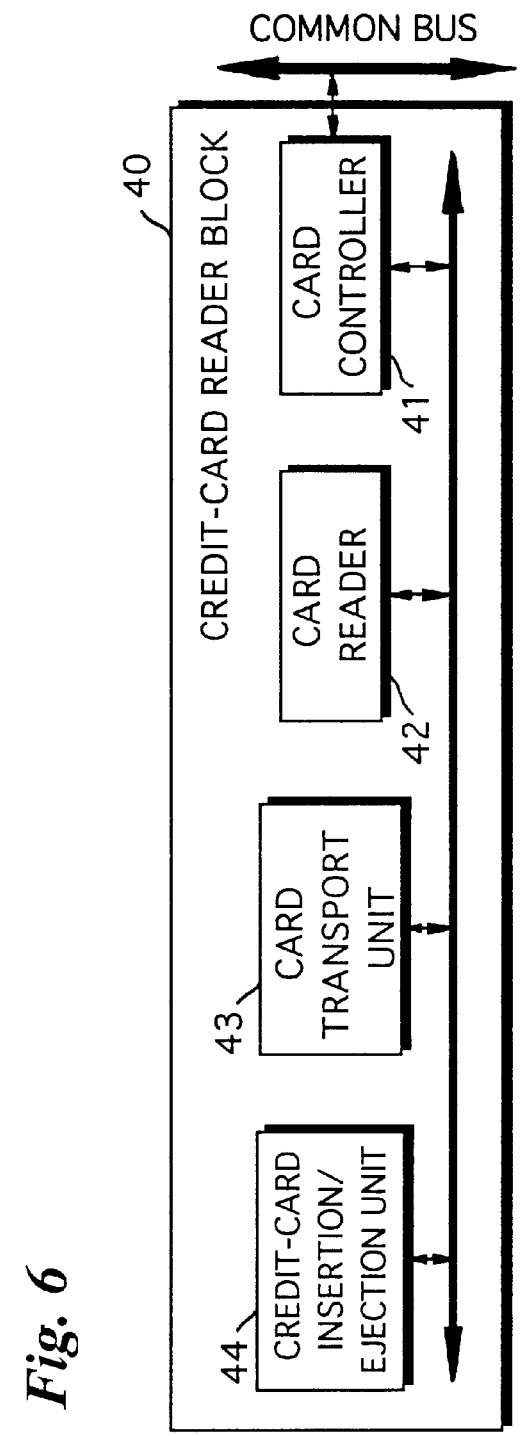
FIG. 6 is a block diagram showing the details of the electrical construction of a credit-card reader block.

FIG. 6 is a block diagram illustrating the details of the electrical construction of the credit-card reader block 40.

The credit-card reader block 40 is for reading credit information that has been recorded on a credit card. The credit-card reader block 40 includes a card controller 41 for exercising control of the overall operation of the credit-card reader block 40; a credit-card insertion/ejection unit 44 for inserting a credit card into the image ordering and printing apparatus 2 and ejecting a credit card that has been inserted; a card transport unit 43 for transporting an inserted credit card; and a card reader 42 for reading credit-card information that has been recorded on an inserted credit card. The components 41 to 44 are connected by the internal bus. The card controller 41 is connected to the common bus.

FIG. 7 is a block diagram illustrating the details of the electrical construction of the communication block 50.

The communication block 50 is for communicating with the host computer 1 and with other image ordering and printing apparatus. The communication block 50 includes an external-communication controller 51 and an external-communication unit 52, which is for performing data communication with the host computer 1 and with other image ordering and printing apparatus. The external-communication controller 51 is connected to the common bus.

FIG. 8 is a block diagram illustrating the details of the electrical construction of the central processing block 60.

The central processing block 60 is for exercising control of the overall operation of the image ordering and printing apparatus 2. The central processing block 60 includes a central processing unit 62 for controlling the overall operation of the central processing block 60, and a data storage unit 61 for temporarily storing various data. The data storage unit 61 and central processing unit 62 are connected to the common bus.

FIG. 9 is a block diagram illustrating the details of the electrical construction of the printing block 70.

The printing block 70 is for printing images represented by image data. The printing block 70 includes a print controller 71 for exercising control of the overall operation of the printing block 70; printers 75A to 75N for printing images represented by image data; packaging units 76A to 76N for packaging prints that have been printed by the printers 75A to 75N; a print transport unit 74 for transporting prints; a print retaining unit 73 for temporarily retaining prints; and a print ejection unit 72 for ejecting prints. The components 71 to 76N are connected by the internal bus. The print controller 71 is connected to the common bus.

Figure 10:
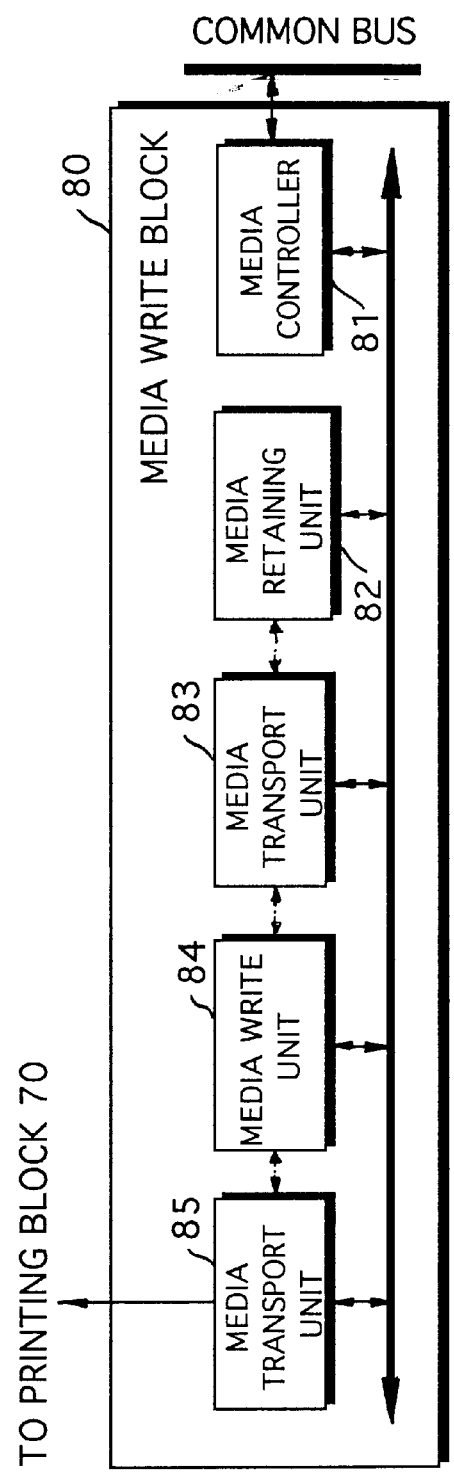
FIG. 10 is a block diagram showing the details of the electrical construction of a medium write block.

FIG. 10 is a block diagram illustrating the details of the electrical construction of the medium write block 80.

The medium write block 80 is for writing image data to media. The medium write block 80 includes a medium controller 81 for exercising control of the overall operation of the medium write block 80; a medium retaining unit 82 for temporarily retaining a medium; a medium transport unit 83 for transporting a medium; a medium write unit 84 for writing image data to a medium; and a medium transport unit 85 for transporting a medium to the printing block 70. These components are interconnected by the internal bus. The medium controller 81 is connected to the common bus.

Figure 11:
FIG. 11 is a diagram showing the front side of a boarding ticket.
Figure 12:
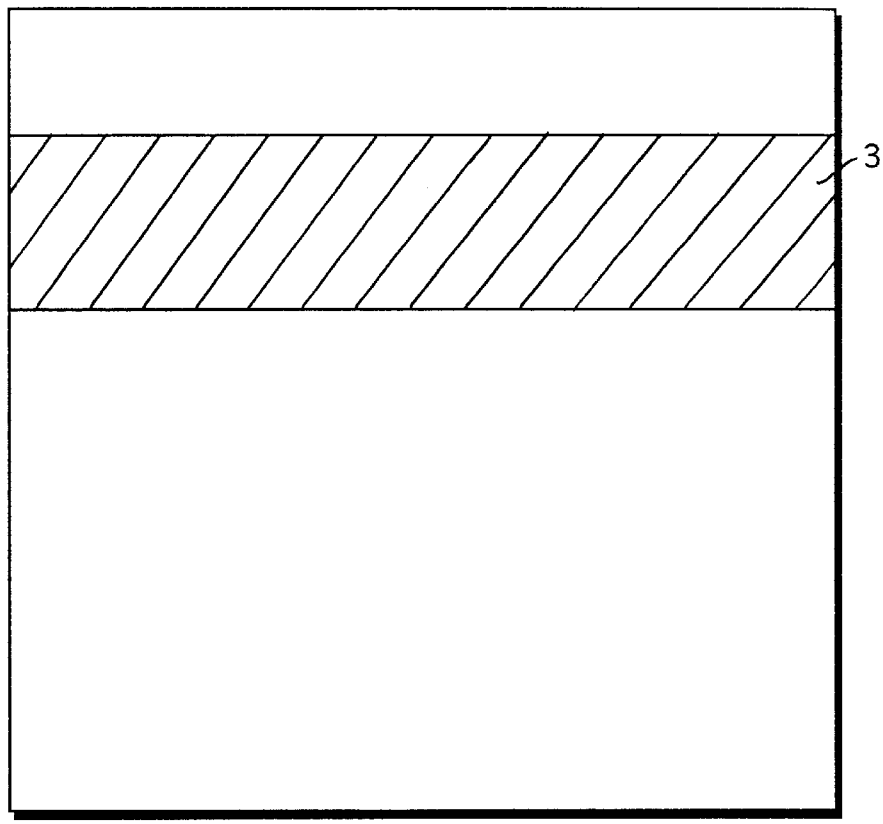
FIG. 12 is a diagram showing the back side of the boarding ticket.

FIG. 11 illustrates the front side and FIG. 12 the back side of an airplane boarding ticket.

Written on the front side of the airplane boarding ticket is boarding-ticket information which includes the name of the user boarding the airplane, the destination of the airplane, the flight name of the airplane, the boarding gate, the departure time, date of embarkation and the seat number. Thus, the destination of the user and time of arrival are known from the boarding-ticket information. (The time of arrival can be determined from the departure time and destination.)

Further, as shown in FIG. 12, the back side of the ticket is formed to have a magnetic recording portion 3. The boarding-ticket information (name, destination, flight, departure time, embarkation data, seat number, etc.) written on the front side of the boarding ticket is readably recorded in the magnetic recording portion 3 in the form of magnetic information.

FIG. 13 shows a management table of the print ordering apparatus. The table is stored in the host computer 1.

The items of data stored in the management table of the print ordering apparatus will now be described.

Ordering apparatus address:

This is the address of the image ordering and printing apparatus.

Location:

This is the location of the image ordering and printing apparatus.

Operating status:

This is the operating status of the image ordering and printing apparatus. "READY" means that the apparatus is capable of operation, "BUSY" that the apparatus is currently operating, and "NG" that the apparatus is incapable of operating.

Number of internal printers:

This indicates the number of printers provided within the image ordering and printing apparatus.

Number of sheets remaining:

This indicates the number of sheets of printing paper remaining in the printer within the image ordering and printing apparatus.

Printing capability:

This is the printing speed of the printer within the image ordering and printing apparatus.

Printer job count:

This indicates the number of commands to be executed by the image ordering and printing apparatus.

Time required for printer job:

This indicates the time required for the image ordering and printing apparatus to perform processing.

Printer job completion time:

This indicates the time at which processing by the image ordering and printing apparatus will be completed.

Printer job time limit:

This indicates the deadline by which processing by the image ordering and printing apparatus is to be completed.

These items of data are stored for each image ordering and printing apparatus installed at respective airports. The numbers of sheets of paper remaining, the printer job counts, the times required for printer jobs, the printer job completion times and the printer job time limits are stored in association with the number of printers provided within the image ordering and printing apparatus.

Figure 14:
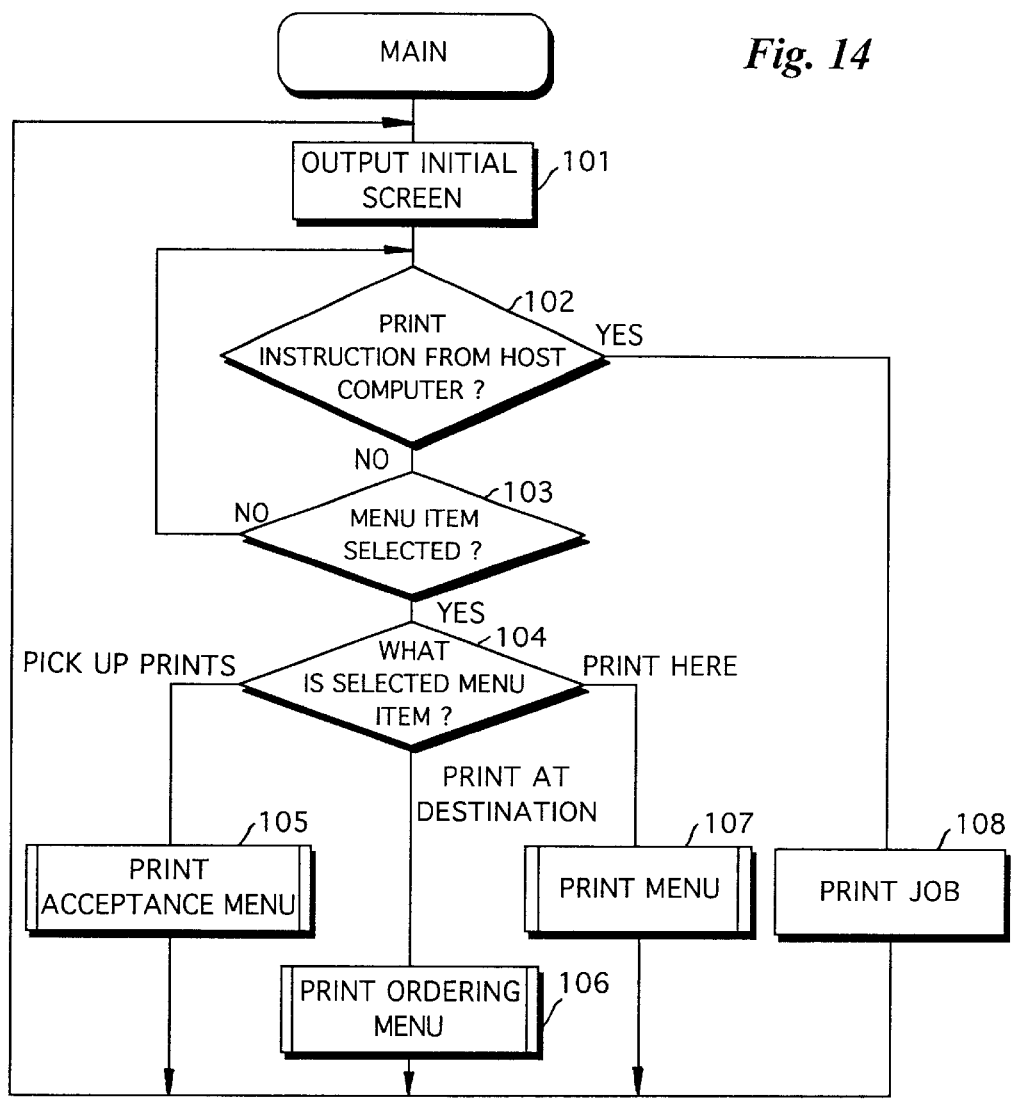
FIG. 14 is a flowchart illustrating an overview processing executed by the print ordering apparatus.
Figure 15:
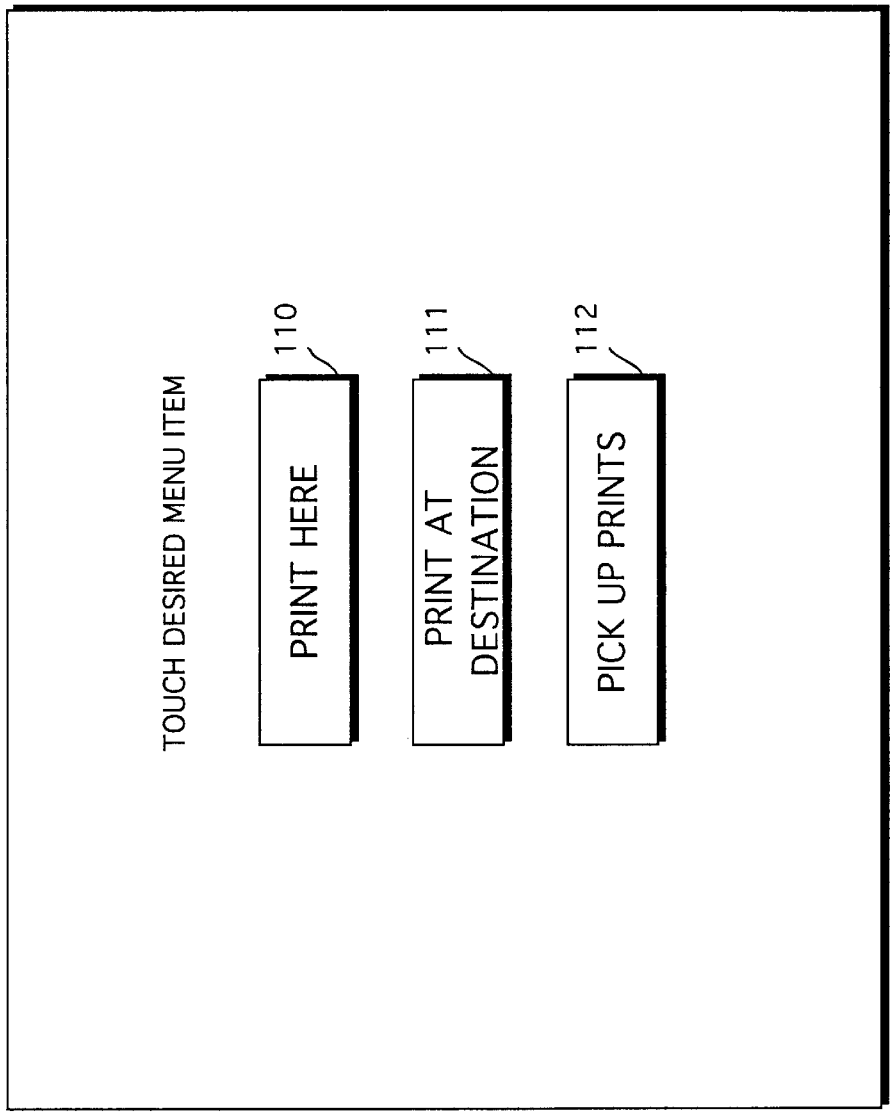
FIG. 15 shows an example of a display screen presented on a display unit of the print ordering apparatus.
Figure 16:
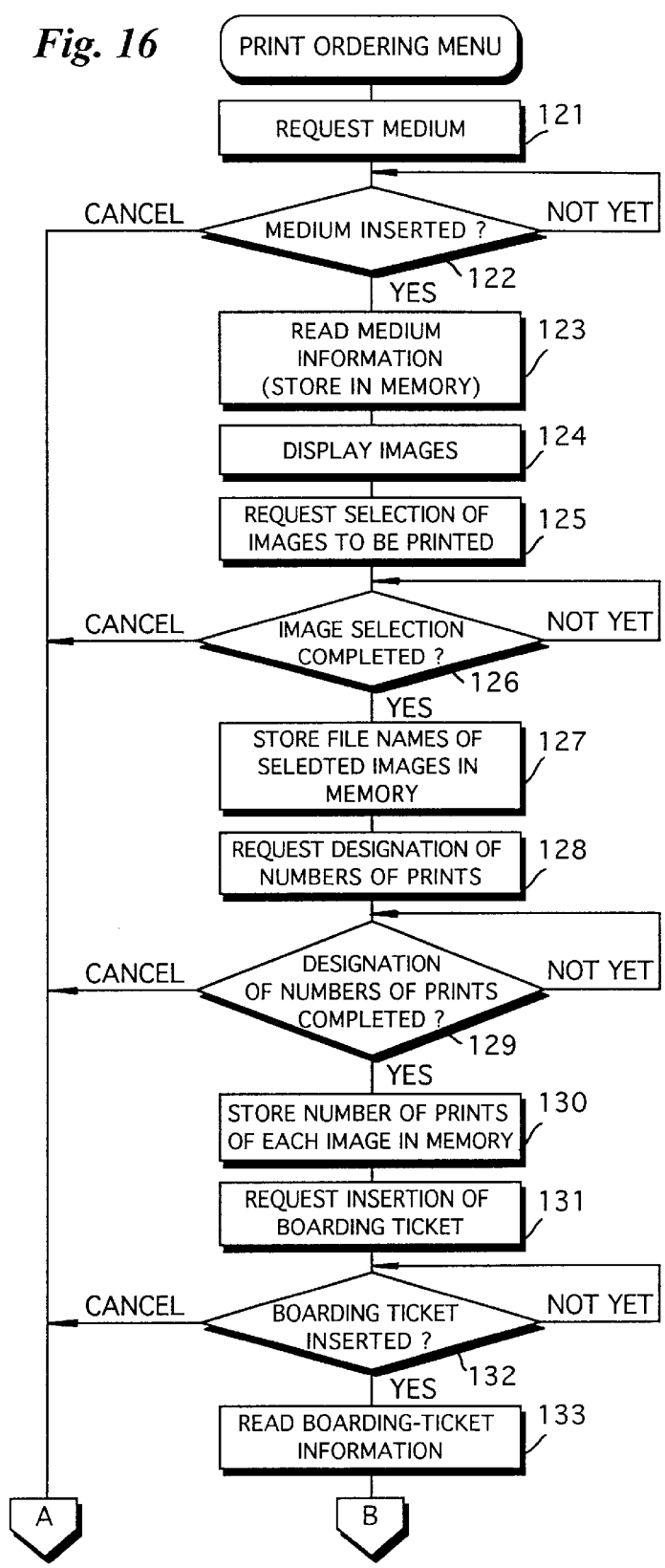
FIGS. 16 to 19 are flowcharts illustrating processing associated with a print ordering menu.
Figure 17:
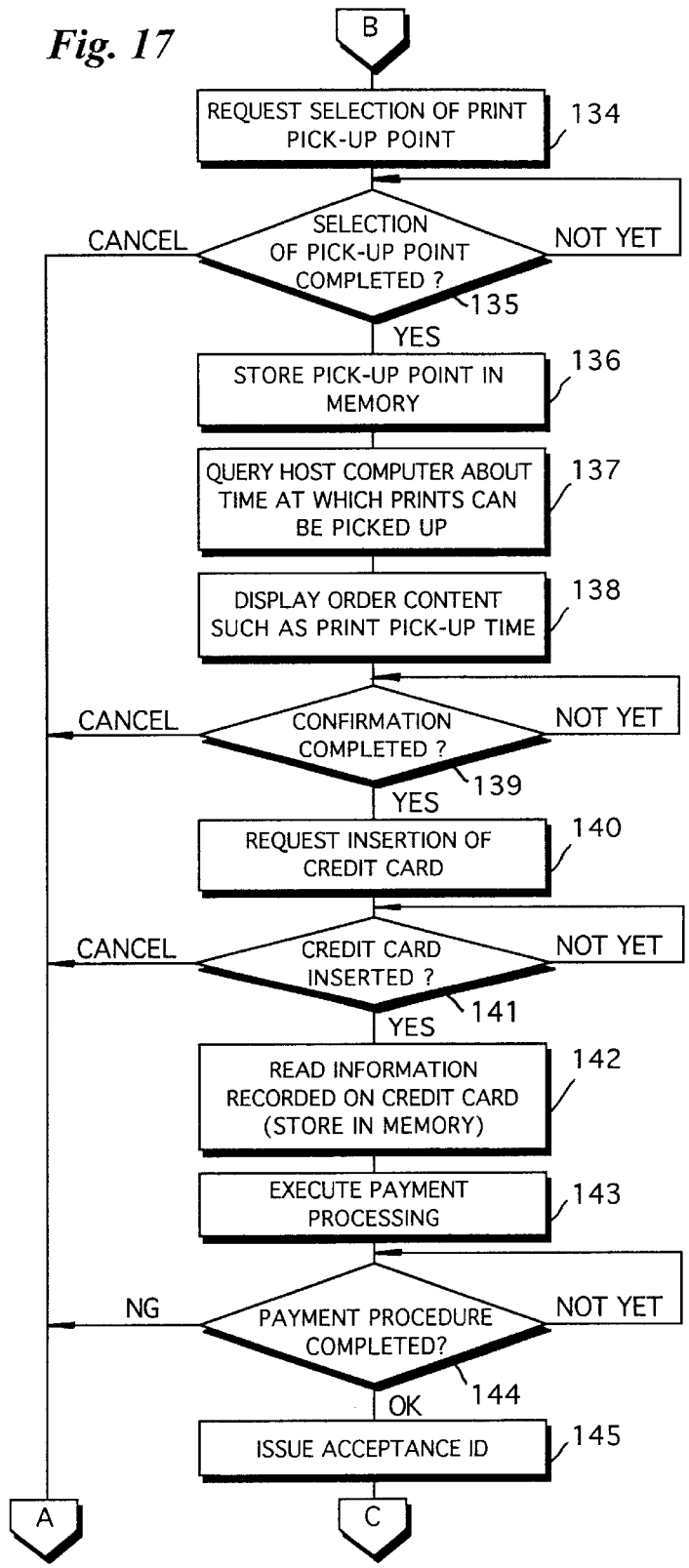
Figure 18:
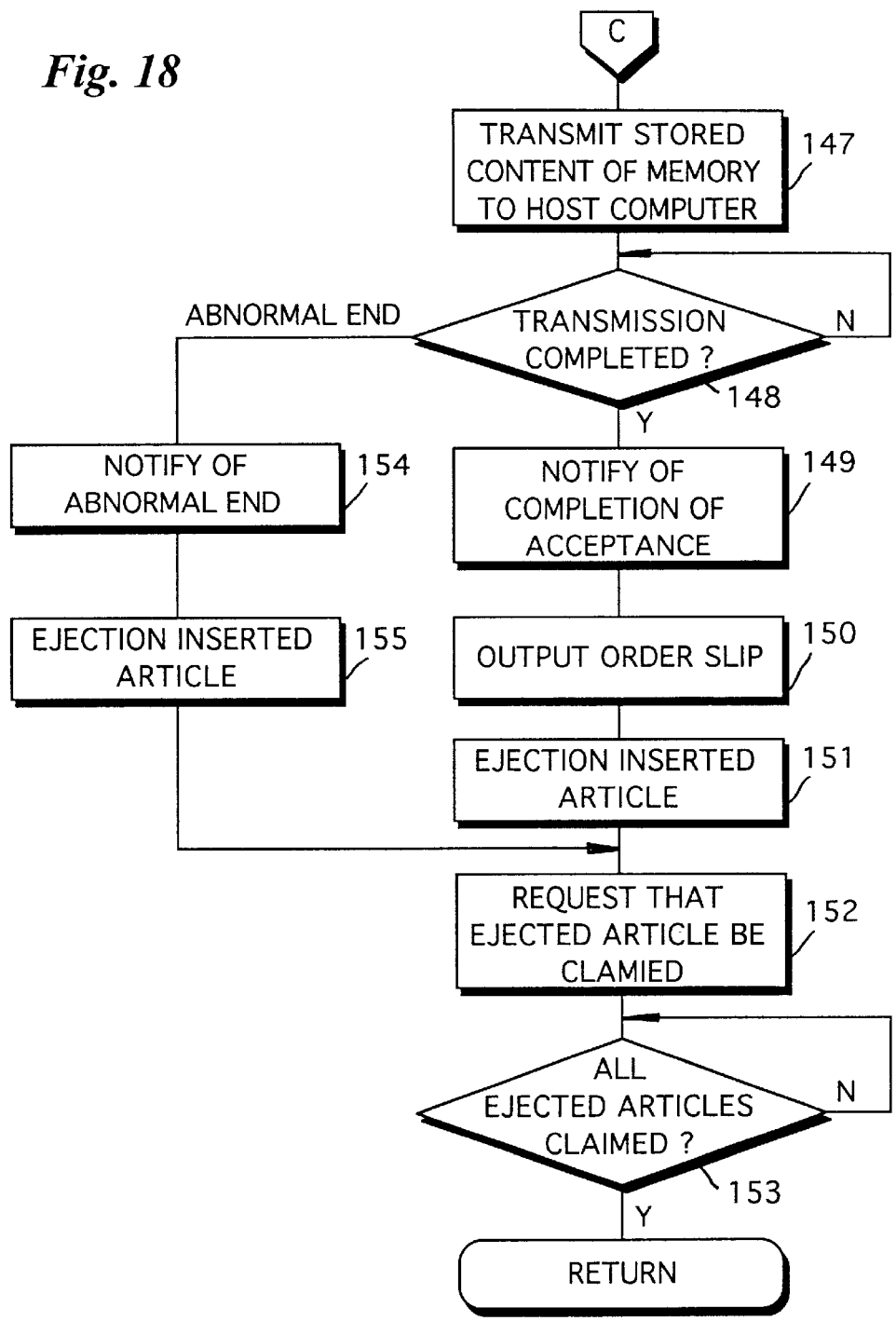
Figure 19:
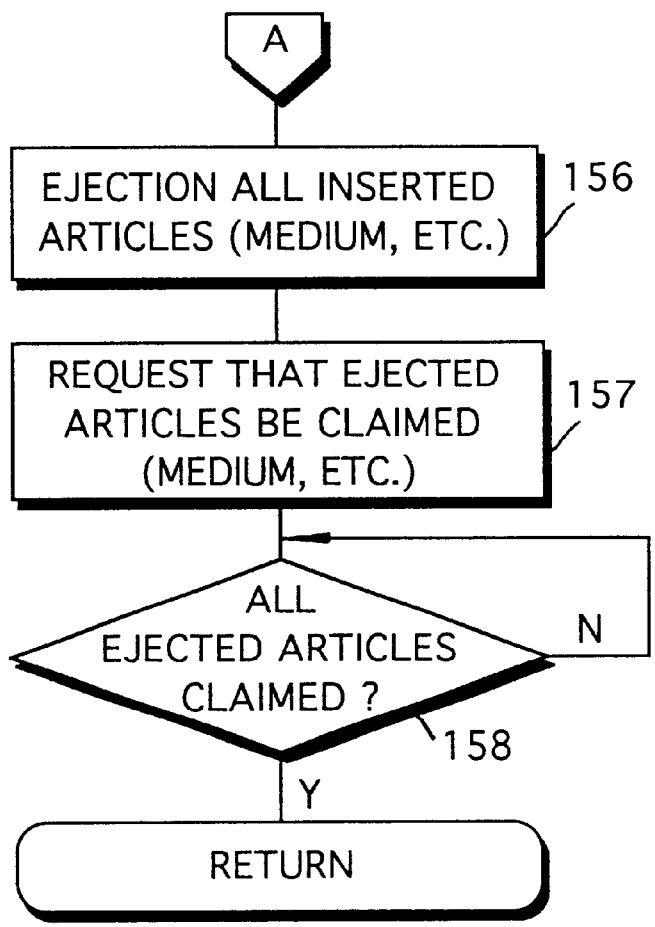

FIG. 14 is a flowchart showing an overview of processing executed by the image ordering and printing apparatus 2, and FIG. 15 illustrates an example of a display screen presented on the display unit 12 of the image ordering and printing apparatus 2.

First, an initial screen of the kind shown in FIG. 15 is displayed on the display unit (step 101 in FIG. 14). The initial screen includes the following areas:

"PRINT HERE" area 110:

This is an area touched by the user when the user orders the printing of images at an image ordering and printing apparatus available where the user is currently located and has this image ordering and printing apparatus, which is the same as the image ordering and printing apparatus used to order the printing of the images, print the images without traveling somewhere and without picking up the printed images at a destination.

"PRINT AT DESTINATION" area 111:

In a case where the user is going to travel, this area is touched by the user when the user is to pick up printed images at an airport located at the destination.

"PICK UP PRINTS" area 112:

In a case where the user has traveled and ordered printed images at the point of departure, this area is touched by the user when the user receives the printed images at the point of arrival.

As will be described later, a print instruction from the host computer 1 takes priority over a command from the user. In case of a print instruction ("YES" at step 102), a print job operation is performed based upon the print instruction (step 108).

In the absence of a print instruction from the host computer 1 ("NO" at step 102), processing conforming to the area touched by the user is executed (steps 103, 104). Processing associated with a print acceptance menu is executed (step 105) when the area 112 is touched by the user, processing associated with a print ordering menu is executed (step 106) when the area 111 is touched by the user, and processing associated with a print menu is executed (step 107) when the area 110 is touched by the user.

Figure 20:
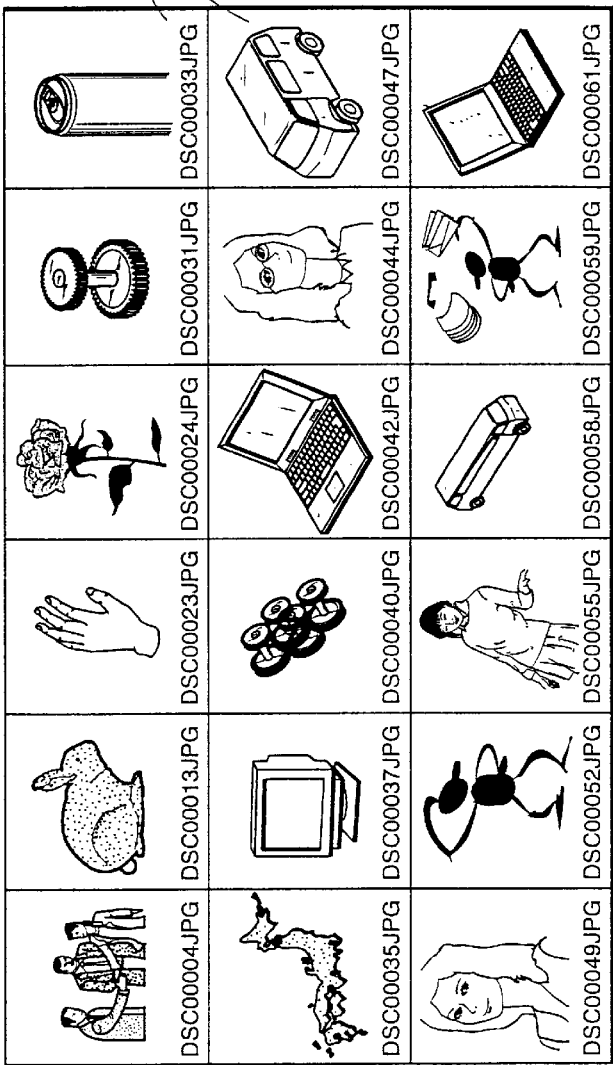
FIGS. 20 and 21 illustrate examples of display screens presented on the display unit of the print ordering apparatus.
Figure 21:
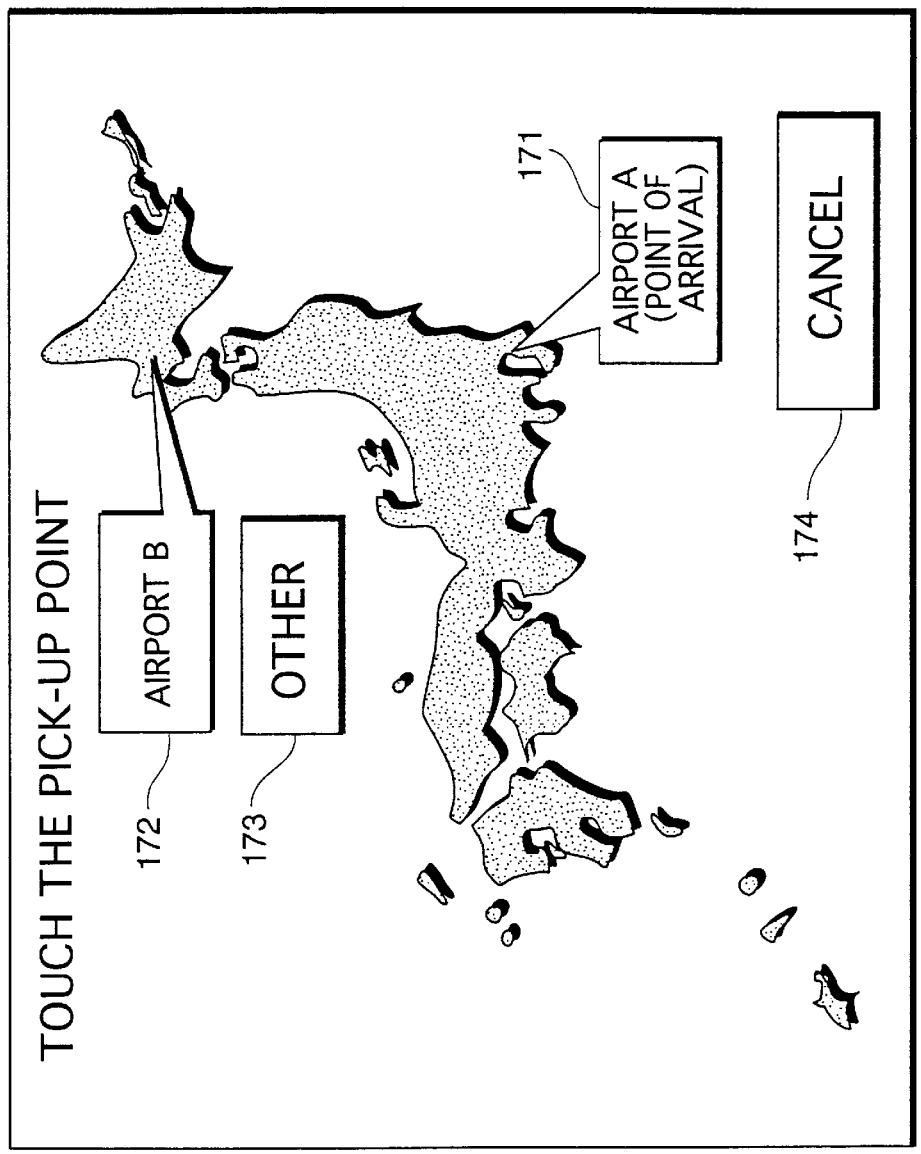

FIGS. 16 to 19 are flowcharts illustrating processing associated with the print ordering menu, FIGS. 20 and 21 illustrate examples of display screens presented on the display unit 12 of the print ordering and printing apparatus 2, and FIG. 22 illustrates an example of an order slip output by the image ordering and printing apparatus.

A request to insert the recording medium is displayed on the display screen of the display unit 12 (step 121). The medium on which the image data has been recorded is inserted into the medium insertion/ejection unit 25 by the user (step 122) and is then transported to the medium reader 22 by the medium transport unit 23. Image data that has been recorded on the inserted medium is read by the medium reader 22 (step 123). The image data that has been read is then stored temporarily in a memory within the data storage unit 61.

The data stored temporarily in the internal memory of the data storage unit 61 is input to the operation/display controller 11 and is applied from the operation/display controller 11 to the display unit 12. Thumbnail images of the images of the images represented by the image data that has been stored on the medium are displayed in at-a-glance fashion (step 124), as shown in FIG. 20. A request to select images to be printed is then made (step 125). It goes without saying that the thumbnail-image data has been recorded on the medium in advance. It is of course possible, however, to generate the thumbnail-image data in the central processing unit 62 rather than record this data on the medium.

The at-a-glance display screen shown in FIG. 20 includes the following areas:

At-a-glance display area 160:

This area displays, in at-a-glance fashion, the thumbnail images of images represented by image data that has been recorded on a medium.

Thumbnail-image display areas 161:

These areas display the thumbnail images as well as associated file names.

Selection-completed area 162:

This area is touched by the user when selection of images to be printed has been completed.

Cancel area 163:

This area is touched by the user to cancel an operation.

From among the thumbnail images displayed in area 160, the user touches thumbnail images of one or a plurality of frames corresponding to images desired to be printed. If the user has touched all thumbnail images to be printed, then the user touches the selection-completed area 162. Selection of images is thus completed (step 126). When selection of images is completed, the file names of the selected images are stored in the memory of data storage unit 61 (step 127).

The display screen of the display unit 12 changes over to a screen for specifying the numbers of prints (step 128). The number of prints per selected image is specified by the user on this screen (step 129). When the numbers of prints are specified, these are stored in the memory of data storage unit 61 in association with the corresponding images (step 130).

The display screen of the display unit 12 now changes over to a screen requesting the insertion of a boarding ticket (step 131). The user inserts a boarding ticket in the boarding-ticket insertion/ejection unit 34 in accordance with this screen (step 132). When the ticket is inserted into the boarding-ticket insertion/ejection unit 34, the ticket is transported to the boarding-ticket reader 32 by the boarding-ticket transport unit 33. Next, the boarding-ticket information that has been recorded in the magnetic recording portion 3 of the inserted boarding ticket is read by the boarding-ticket reader 32 and the read boarding-ticket information is stored in the memory of data storage unit 61 (step 133).

Next, the display screen of the display unit 12 changes over to a screen (see FIG. 21) requesting selection of a location at which prints are to be picked up (step 134). This screen includes an area 171 representing airport A, which is the point of departure; an area 172, which represents airport B at the arrival point determined from the read boarding-ticket information; an area 173 touched by the user when the pick-up point is an airport other than that indicated by the boarding-ticket information read from the boarding ticket; and a cancel area 174.

When the location at which prints are to be picked up is other than an arrival point that can be determined from the boarding-ticket information, the user touches the area 173, as mentioned above, whereupon the names of other airports appear. From among the displayed names of these airports, the user touches the name of an airport at which the prints are to be picked up. When the selection of the pick-up point has been completed ("YES" at step 135), data indicating the selected pick-up point is stored in the memory of data storage unit 61 (step 136).

Data representing the specified numbers of prints (inclusive of print size) and the pick-up point that have been stored in the memory of data storage unit 61 is transmitted from the external-communication unit 52 of image ordering and printing apparatus 2 to the host computer 1 and the host computer 1 is queried in regard to the time at which the prints can be picked up (step 137).

On the basis of the specified numbers of prints and pick-up point sent from the image ordering and printing apparatus 2, the host computer 1 calculates the time at which it will be possible to pick up printed images when the printer at the pick-up point prints images of the specified numbers. Data representing the calculated pick-up time is transmitted from the host computer 1 to the image ordering and printing apparatus 2 that inquired about the pick-up time. The calculation of the time at which prints can be picked up will be described later in greater detail.

When the image ordering and printing apparatus 2 receives the data representing the pick-up time, this time is displayed on the display screen of the display unit 12 (step 138). Thus the time at which the printed images can be picked up may be checked by the user (step 139).

When pick-up time has been confirmed by the user ("YES" at step 139), the display screen of the image ordering and printing apparatus 2 changes over to a screen displaying a request to insert a credit card (step 140). The user responds by inserting a credit card into the credit-card insertion/ejection unit 44 ("YES" at step 141). The inserted credit card is transported to the card reader 42 by the card transport unit 43. Credit-card information that has been recorded on the credit card is read by the card reader 42 and the credit-card information that has been read is stored temporarily in the memory of the data storage unit 61 (step 142).

Payment of the image printing fee is carried out using the inserted credit card (step 143). When the payment procedure is completed ("YES" at step 144), an acceptance ID is issued by the central processing unit 62 (step 145). The issued acceptance ID also is stored temporarily in the memory of data storage unit 61. It goes without saying that the printing fee may be indicated to the user in advance.

Data representing the read image data, selected image file names, numbers of prints, boarding-ticket information, print pick-up point, credit-card information and issued ID, which has been stored in the memory of the data storage unit 61, is transmitted from the image ordering and printing apparatus 2 to the host computer 1 (step 147).

If transmission ends without incident ("YES" at step 148), notification of completion of acceptance is transmitted from the host computer 1 to the image ordering and printing apparatus 2 (step 149).

When notification of completion of acceptance is received, the print order slip shown in FIG. 22 is output by the printer 75A (step 150). Printed on this print order form are the acceptance ID, the acceptance date and time, the acceptance location, the number of the image-print ordering apparatus, the print pick-up point, the scheduled date and time of print pick-up, the number of the print pick-up apparatus and the name of the orderer. It goes without saying that the name of the orderer can be determined from the boarding-ticket information.

Further, the boarding ticket inserted into the image ordering and printing apparatus 2 is ejected from the boarding-ticket insertion/ejection unit 34 and returned to the user (step 151). If any article ejected from the image ordering and printing apparatus 2 is not claimed by the user, then a screen requesting that the user claim the ejected article is displayed on the display unit 12 (step 152). Order processing ends when the user has claimed all articles ejected (step 153).

If the transmission from the image ordering and printing apparatus 2 to the host computer 1 ends abnormally (step 148), the user is notified of abnormal end (step 154) and all articles such as the boarding ticket and medium that were inserted into the image ordering and printing apparatus 2 are ejected (step 155). The user would repeat the print ordering procedure if necessary.

If the user cancels an operation during the ordering of image prints, then articles inserted into the image ordering and printing apparatus 2 thus far are ejected and returned to the user (step 156). A display is presented prompting the user to claim the ejected articles (step 157). The user then claims these articles (step 158).

Figure 23:
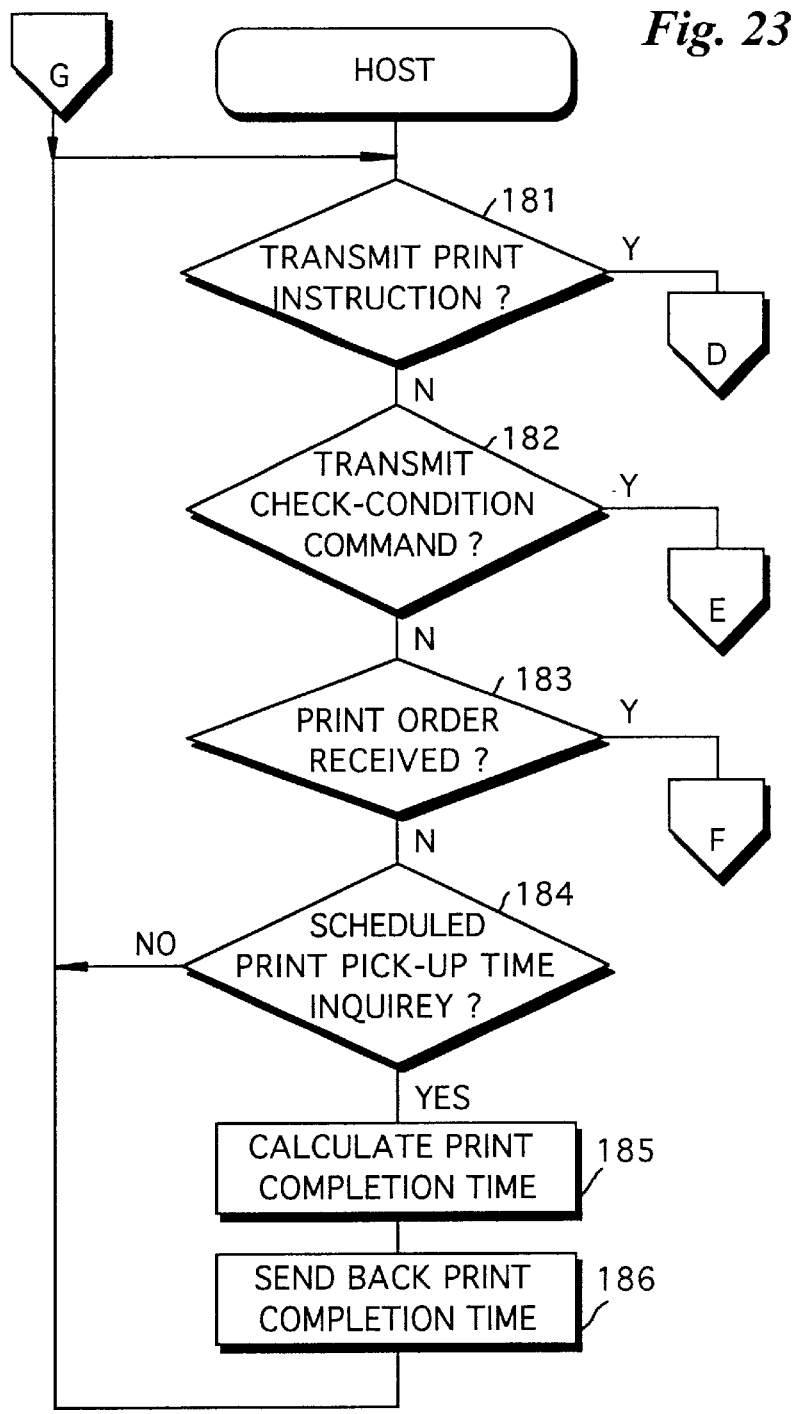
FIGS. 23 and 24 are flowcharts showing processing executed by a host computer.
Figure 24:
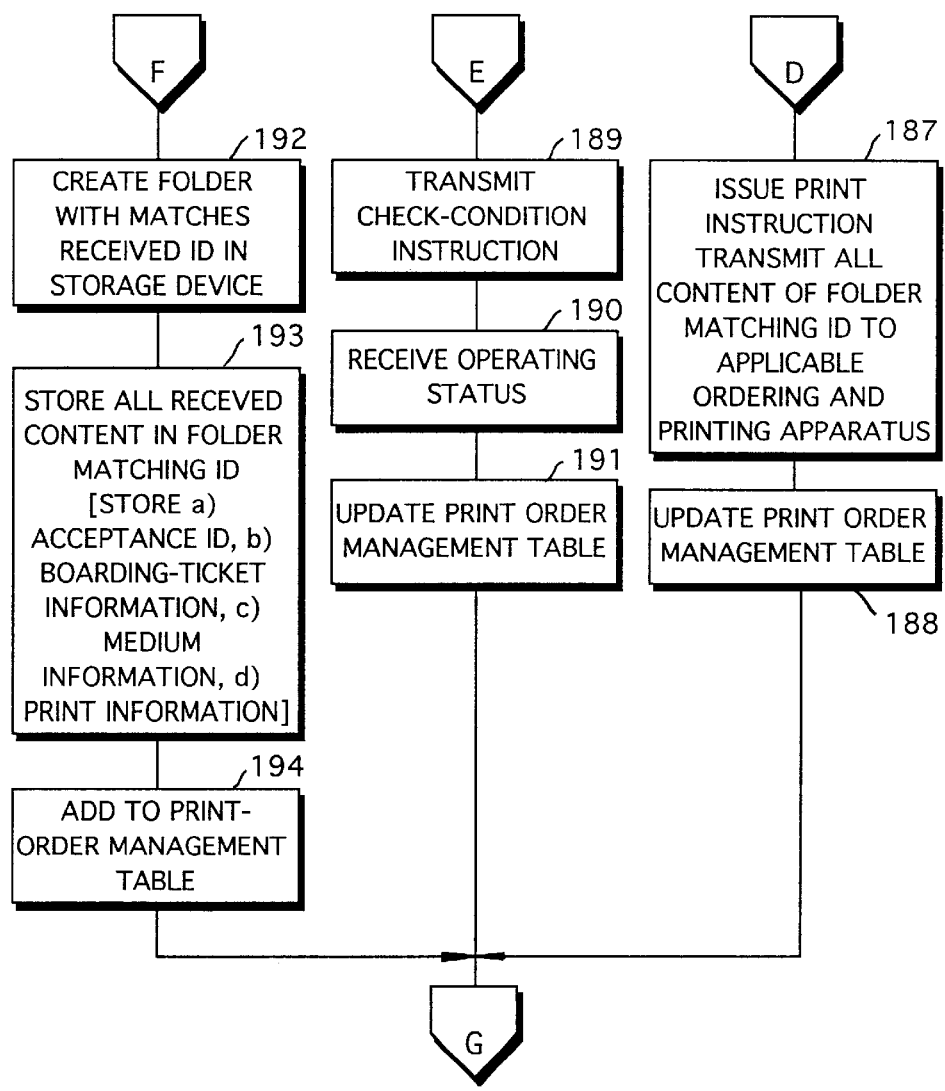

FIGS. 23 and 24 are flowcharts illustrating processing executed by the host computer 1.

The host computer 1 determines whether to transmit a print instruction to the image ordering and printing apparatus 2 (step 181), to transmit a check-condition command to the image ordering and printing apparatus 2 (to cause the operating status of the image ordering and printing apparatus 2 to be transmitted to the host computer 1) (step 182), to see whether a print order has been received (step 182) or whether there has been an inquiry about the scheduled time at which prints are to be picked up (step 184).

If a print instruction is to be transmitted ("YES" at step 181) (if the present time is equal to the difference obtained by subtracting the time required for printing from the time at which a printing job by the printer used is to end, then a print instruction is transmitted to the image ordering and printing apparatus 2), the boarding-ticket information, medium information, print information, credit-card information and acceptance ID information stored temporarily in the host computer 1 are transmitted to the image ordering and printing apparatus 2 to which the print instruction is to be transmitted (step 187). In response to completion of transmission, the corresponding information in the table that manages the image ordering and printing apparatus is updated (step 188). For example, the operating status is changed from "READY" to "BUSY".

In case of the check condition ("YES" at step 182), the check-condition instruction is transmitted to the image ordering and printing apparatus 2 whose status is to be checked (step 189). The image ordering and printing apparatus 2 that has received the check-condition instruction transmits its operating status to the host computer 1. The host computer 1 receives the operating status (step 190) and the corresponding operating status is updated if necessary (step 191).

If a print order is received ("YES" at step 183), a folder is generated for every acceptance ID transmitted from the image ordering and printing apparatus 2 (step 192). The generated folder contains the boarding-ticket information transmitted from the image ordering and printing apparatus 2, medium information, print information, credit-card information and acceptance ID transmitted from the image ordering and printing apparatus 2 (step 193). A printer job based upon this received information is added to the table that manages the image ordering and printing apparatus (step 194).

In case of a print pick-up time inquiry ("YES" at step 184), the print completion time is calculated based upon the capability and numbers of prints to be produced by the image ordering and printing apparatus 2 installed at the pick-up point (step 185). The data representing calculated print completion time is transmitted to the image ordering and printing apparatus 2 that made the inquiry (step 186). Calculation of print completion time is performed in the manner described below.

Specifically, it is determined whether the printers incorporated within the image ordering and printing apparatus 2 deployed at the print pick-up point include a printer for which no job is scheduled (i.e., a printer not scheduled to perform print processing). When the image ordering and printing apparatus 2 includes a printer for which no job is scheduled, it is determined whether the number of sheets of paper left in the printer is greater than the number of prints. If the number of sheets of paper left in the printer is greater than the number of prints, the time required to complete printing is calculated from the printer capability and number of prints. If the time to completion of printing arrives before the user arrival time, then the user arrival time becomes the printing completion time.

If all of the printers incorporated within the image ordering and printing apparatus 2 deployed at the print pick-up point are printers for which print processing is scheduled, then a printer whose remaining number of sheets of paper is greater than the number of prints is found. If print starting time (time obtained by subtracting the time required for printing from the user arrival time) is later than a print completion time that has already been registered, then the user arrival time becomes the print completion time.

If print starting time is earlier than a print completion time that has already been registered, then the time is moved up. That is, if there is no registered print job the completion time of which is later than a time obtained by subtracting the earlier time desired and the time required for printing of a print job from the completion time of the print job, and if the time resulting from this subtraction is later than the present time, then the user arrival time becomes the print completion time.

In a case where none of the above-mentioned conditions apply, then, with regard to printers whose remaining numbers of sheets of paper are greater than the number of prints, the time obtained by adding the time required for printing to the earliest print completion time is adopted as the scheduled print completion time.

Figure 25:
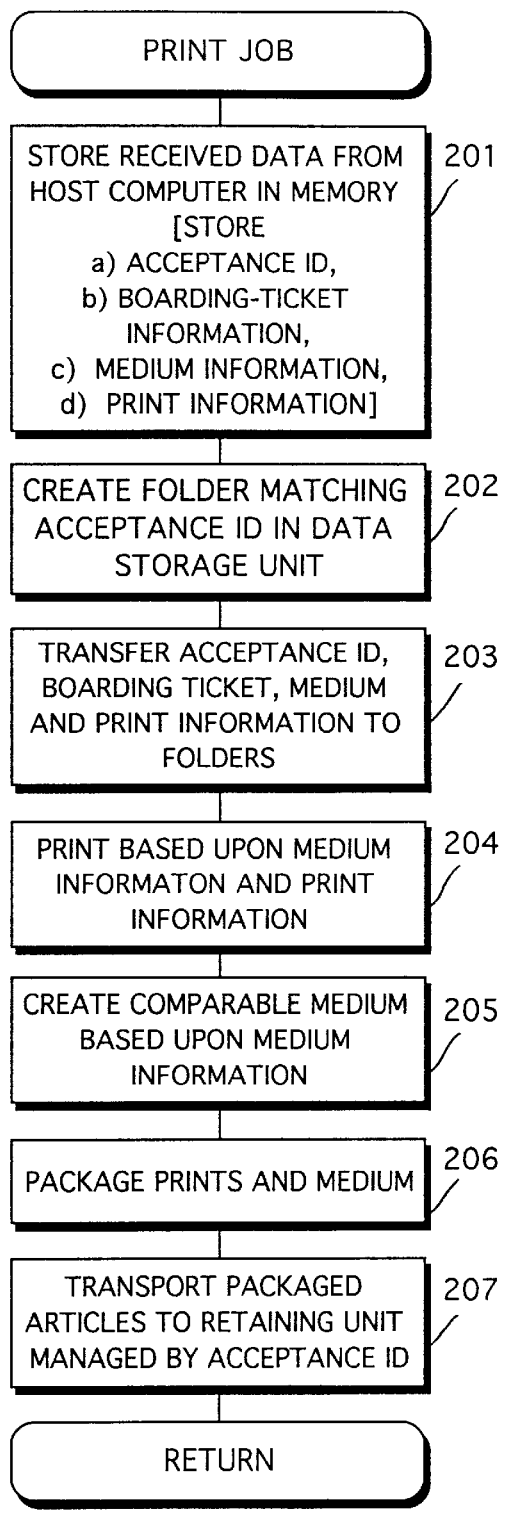
FIG. 25 is a flowchart showing processing of a print job.

FIG. 25 is a flowchart showing processing associated with a print job.

As set forth above, a print job starts when a print instruction from the host computer 1 is transmitted to the image ordering and printing apparatus 2.

The host computer 1 transmits acceptance IDs, boarding-ticket information, medium information and print information, and the information is stored temporarily in the data storage unit 61 of the image ordering and printing apparatus 2 (step 201). An acceptance ID folder is generated for each acceptance ID in the data storage unit 61 (step 202). The acceptance IDs, boarding-ticket information, medium information and print information stored temporarily in the data storage unit 61 are transferred to the folders generated in the data storage unit 61 (step 203).

Medium information and print information is read from a folder generated in the data storage unit 61 and the information is then applied to the print controller 71. The image data is applied to a printer decided based upon the management table of the image ordering and printing apparatus (it goes without saying that data specifying the printer has been applied to the image ordering and printing apparatus 2 from the host computer 1), and the image is printed by this printer (step 204). Further, on the basis of the medium information, it is determined whether the medium is of a type identical with that of the medium that was inserted into the image ordering and printing apparatus 2 by the user when prints were ordered. A medium of the same type is extracted from the media retaining unit 82 (step 205) and the medium is transported to the printing block 70 via the media transport units 83 and 85. The prints printed by the printer 75A and the medium are packaged at the packaging unit 76A (step 206). The packaged prints and medium are transported to the print retaining unit 73 and are retained there temporarily (step 207).

Figure 26:
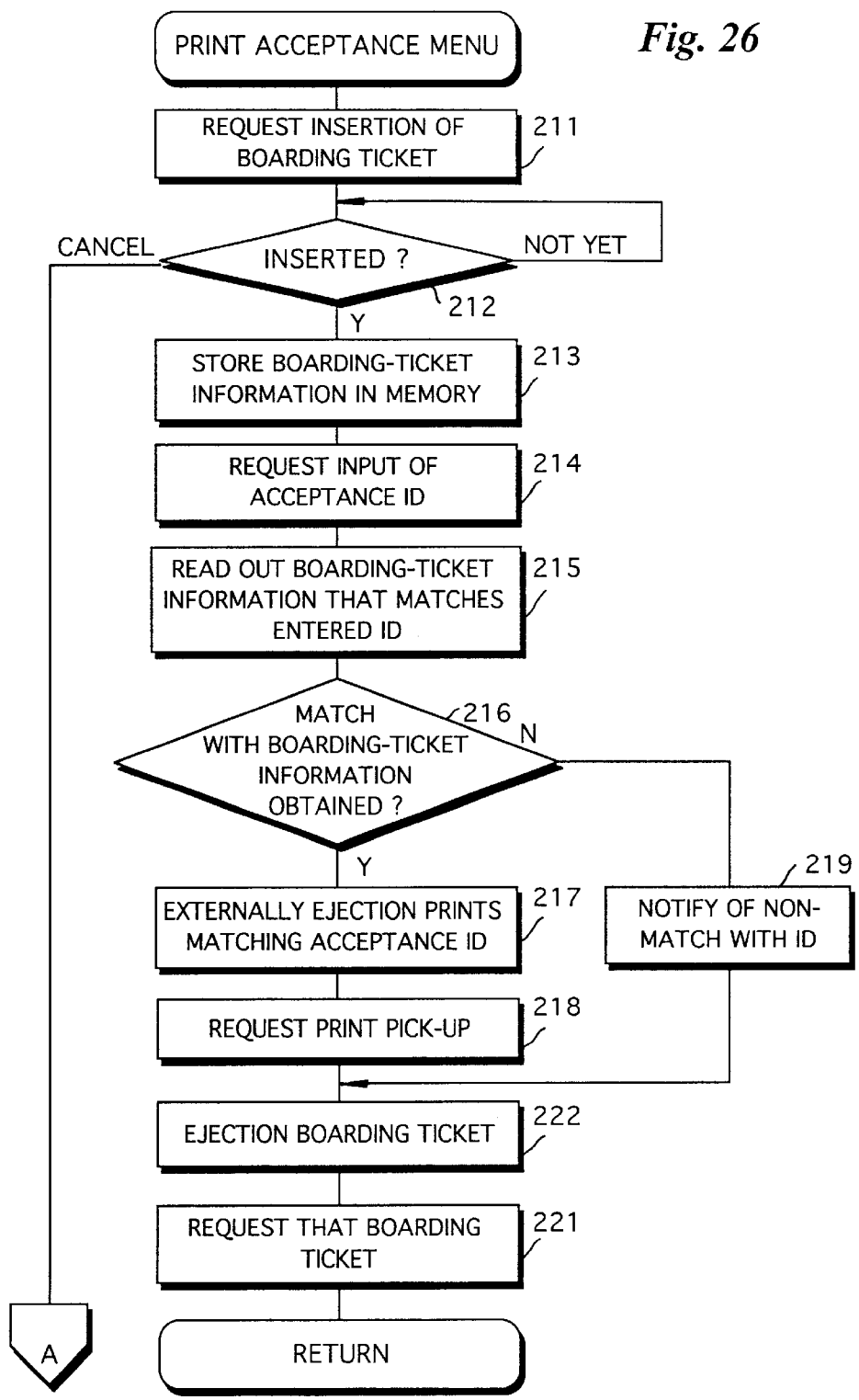
FIG. 26 is a flowchart showing processing associated with a print acceptance menu.

FIG. 26 is a flowchart illustrating processing associated with the print acceptance menu.

If the print pick-up area 112 is touched by the user, processing associated with the print acceptance menu starts, as mentioned earlier.

A request to insert a boarding ticket is displayed on the display screen of the display unit 12 (step 211). If a boarding ticket is inserted into the boarding-ticket insertion/ejection unit 34 ("YES" at step 212), the boarding-ticket information that has been recorded on the inserted boarding ticket is read by the boarding-ticket reader 32. Data representing the read boarding-ticket information is stored temporarily in the memory of the data storage unit 61 (step 213).

Next, a request for input of an acceptance ID is displayed on the display screen of the display unit 12 (step 214). If the user enters an acceptance ID, the folder of the entered ID is retrieved from the data storage unit 61. It is then determined whether the boarding-ticket information contained in the retrieved folder and the boarding-ticket information recorded on the inserted boarding ticket match (step 216).

If a match is obtained ("YES" at step 216), the prints and medium specified by this acceptance ID are extracted from the print retaining unit 73 and ejected from the print ejection unit 72 via the print transport unit 74 (step 217). A screen instructing the user to pick up the prints and medium is displayed on the display unit 12 (step 218).

If the items of boarding-ticket information do not match ("NO" at step 216), the fact that the acceptance ID does not match is displayed on the display screen of the display unit 12 (step 219).

The boarding ticket that was inserted into the image ordering and printing apparatus 2 is ejected from the boarding-ticket insertion/ejection unit 34 (step 220) and a display prompting the user to claim the ejected boarding ticket is presented on the display unit 12 (step 221).

In a case where the items of boarding-ticket information do not match ("NO" at step 216), the user would insert the boarding ticket again if necessary to receive the prints.

In the embodiment described above, the recording medium is inserted when the printing of images is ordered and a medium comparable with that of the inserted medium is delivered to the user when the user picks up the prints. However, the medium inserted when the printing of images is ordered may be returned to the user on the spot.

FIG. 27 illustrates an example of a display presented on the display unit 12 of the image ordering and printing apparatus 2.

In the embodiment described above, an airplane boarding ticket is inserted into the image ordering and printing apparatus 2 and the arrival point is determined from the boarding-ticket information recorded on the boarding ticket. However, the arrival point may be determined by reading the arrival point recorded on a train ticket. It goes without saying that the image ordering and printing apparatus 2 would be deployed at a train station.

In a case where a train ticket is inserted into the image ordering and printing apparatus, the screen shown in FIG. 27 for setting the print pick-up point is presented on the display screen of the image ordering and printing apparatus 2.

Displayed on this screen for setting the print pick-up point are an area 231 which displays the departure point (train station) included in the ticket information recorded on the ticket; an area 232 which displays the arrival point (train station) included in the ticket information; an area 233 touched by the user in a case where prints are to be picked up at a location other than the arrival point included in the ticket information; and a cancel area 234.

The user touches the area 232 if the location at which prints are to be picked up coincides with the arrival point included in the ticket information. The user touches the area 233 if prints are to be picked up at a location other than the arrival point included in the ticket information. In response to touching of the area 233, locations (train stations) in the vicinity of the arrival point are displayed in list form. The user would then select a pick-up point from the locations displayed in the list.

FIG. 28 illustrates an example a display presented on the display unit 12 of image ordering and printing apparatus 2.

Train tickets basically can be classified into tickets, such as reserved-seat tickets, from which the destination is known with certainty and tickets, such as commuting tickets, from which the destination cannot always be determined from the ticket information. FIG. 28 shows an example of a display screen presented on the display unit 12 when the user is to designate the print pick-up point in a case where the destination cannot necessarily be determined from the ticket information.

In addition to an area 251 representing the departure point read from the ticket information, areas 252, 253 and 254 indicating train stations that can be reached based upon the ticket fee are displayed on this display screen together with a railroad map. From among the areas 252, 253 and 254 displayed on this display screen, the user touches the area indicating the name of the train station that is his or her own destination. The images that will be printed are received from the image ordering and printing apparatus 2 deployed at the train station represented by the area touched.

If the user's destination is not displayed on this display screen, then the user touches an area 255, whereupon the names of nearby train stations are displayed in list form. It goes without saying that the user selects the destination station from the station names displayed in the list. The user touches an area 256 when this operation is to be canceled.

As many apparently widely different embodiments of the present invention can be made without departing from the spirit and scope thereof, it is to be understood that the invention is not limited to the specific embodiments thereof except as defined in the appended claims.

What is claimed is:

1. An image printing system comprising an image-print ordering apparatus and an image printing apparatus capable of communicating with each other, wherein said image-print ordering apparatus includes:

a destination information reading unit for reading destination-related information from a ticket on which the destination-related information has been recorded in a readable manner;

an image data reading unit for reading image data that has been recorded on a first portable recording medium; and an image data transmitting unit for transmitting the image data, which has been read by said image data reading unit, to said image printing apparatus deployed at a destination specified based upon the destination-related information read by said destination information reading unit; and said image printing apparatus includes:

an image data receiving unit for receiving image data transmitted from said image data transmitting unit of said image-print ordering apparatus; and a printing unit for printing an image represented by the image data received by said image data receiving unit.

2. The system according to claim 1, further comprising a host computer for exercising overall control of the image printing system, wherein:

said image-print ordering apparatus transmits image data read by said image data reading unit to said host computer;

said host computer transmits the image data, which has been sent to it from said image-print ordering apparatus, to said image printing apparatus deployed at a destination specified based upon the destination-related information; and said image printing apparatus receives the image data transmitted from said host computer.

3. The system according to claim 1, wherein said image-print ordering apparatus further includes a first destination notification unit for giving notification of a destination specified by the destination-related information read by said destination information reading unit of said image-print ordering apparatus.

4. The system according to claim 1, wherein said image-print ordering apparatus further includes:
   a second destination notification unit for giving notification of multiple locations, which are capable being reached based upon the ticket, on the basis of the destination-related information read by said destination information reading unit; and
   a designating unit for designating a destination location from among the multiple locations of which notification has been given by said second destination notification unit;
   said image data transmitting unit of said image-print ordering apparatus transmitting the image data, which has been read by said image data reading unit, to said image printing apparatus deployed at the location designated by said designating unit.

5. The system according to claim 1, wherein data representing arrival time is readably recorded on the ticket;
   said image-print ordering apparatus further includes:
      an arrival-time-data reading unit for reading the data representing arrival time from the ticket; and
      an arrival-time-data transmitting unit for transmitting the data representing arrival time read by said arrival-time-data reading unit to said image printing apparatus deployed at a destination specified based upon the destination-related information; and
   said image printing apparatus further includes:
      an arrival-time-data receiving unit for receiving the data representing arrival time transmitted from said arrival-time-data transmitting unit of said image printing apparatus; and
      a first printing control unit for controlling said printing unit in such a manner that images will be printed prior to the arrival time represented by the data representing arrival time received by said arrival-time-data receiving unit.

6. The system according to claim 1, wherein said image-print ordering apparatus further includes:
   an identification issuing unit for issuing identification data; and
   an identification data transmitting unit for transmitting the identification data issued by said identification issuing unit to said image printing apparatus deployed at a destination specified based upon the destination-related information; and
   said image printing apparatus further includes:
      an identification data receiving unit for receiving the identification data transmitted from said identification data transmitting unit of said image-print ordering apparatus;
      a first identification data input unit for inputting identification data;
      an identification data discriminating unit for determining whether identification data received by said identification receiving unit and identification data input from said first identification input unit match; and
      a second printing control unit for controlling said printing unit so as to print images in response to a determination by said identification data discriminating unit that a match has been obtained.

7. The system according to claim 6, wherein identification data is readably recorded on the ticket;
   said identification data issuing unit of said image-print ordering apparatus issues identification data read from the ticket; and
   said identification data input unit of said image printing apparatus reads identification data from the ticket.

8. The system according to claim 6, wherein said image printing apparatus further includes a warning unit for issuing a warning in response to a determination by said identification data discriminating unit that a match has not been obtained.

9. The system according to claim 1, further comprising a recording control unit for recording image data, which has been received by said image data receiving unit, on a second portable recording medium.

10. The system according to claim 1, wherein said image-print ordering apparatus further includes an order-specifying-data recording control unit for recording data, which indicates that printing of images has been ordered, on the ticket; and
    said image printing apparatus further includes:
       an order-specifying-data reading unit for reading the order-specifying data that has been recorded on the ticket; and
       an order notification unit for gives notification of the fact that printing of images has been ordered, in response to reading of the order-specifying data by said order-specifying-data reading unit.

11. An image-print ordering apparatus comprising:
    a destination information reading unit for reading destination-related information from a ticket on which the destination-related information has been recorded in a readable manner;
    an image data reading unit for reading image data that has been recorded on a first portable recording medium; and
    an image data transmitting unit for transmitting the image data, which has been read by said image data reading unit, to an image printing apparatus deployed at a destination specified based upon the destination-related information read by said destination information reading unit.

12. An image output apparatus capable of communicating with an image-print ordering apparatus that is for reading destination-related information from a ticket on which the destination-related information has been recorded in a readable manner, and transmitting image data to an image printing apparatus deployed at a destination specified by the read destination-related information, said image output apparatus comprising:
    an image data receiving unit for receiving image data transmitted from said image data transmitting unit of said image-print ordering apparatus; and
    an output unit for outputting image data received by said image data receiving unit.

13. A method of controlling operation of an image printing system comprising an image-print ordering apparatus and an image printing apparatus capable of communicating with each other, said method comprising the following steps executed by said image-print ordering apparatus:
    reading destination-related information from a ticket on which the destination-related information has been recorded in a readable manner;

reading image data that has been recorded on a first portable recording medium; and transmitting the read image data to the image printing apparatus deployed at a destination specified based upon the read destination-related information;

and the following steps executed by said image printing apparatus:

receiving image data transmitted from said image data transmitting unit of said image-print ordering apparatus; and printing an image represented by the received image data.

14. A method of controlling operation of an image-print ordering apparatus, said method comprising the steps of:

reading destination-related information from a ticket on which the destination-related information has been recorded in a readable manner;

reading image data that has been recorded on a first portable recording medium; and transmitting the read image data to an image printing apparatus deployed at a destination specified by the read destination-related information.

15. A method of controlling operation of an image output apparatus capable of communicating with an image-print ordering apparatus that is for reading destination-related information from a ticket on which the destination-related information has been recorded in a readable manner, and transmitting image data to an image printing apparatus deployed at a destination specified by the read destination-related information, said method comprising the steps of:

receiving image data transmitted from said image-print ordering apparatus; and outputting the image data received.

* * * * *